United States Patent
Kannan et al.

(10) Patent No.: US 7,352,821 B2
(45) Date of Patent: Apr. 1, 2008

(54) METHOD AND APPARATUS FOR ERROR REDUCTION IN AN ORTHOGONAL MODULATION SYSTEM

(75) Inventors: Anand Kannan, Richardson, TX (US); Tamer Kadous, Madison, WI (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/325,821

(22) Filed: Jan. 5, 2006

(65) Prior Publication Data

US 2006/0109925 A1   May 25, 2006

Related U.S. Application Data

(63) Continuation of application No. 09/745,301, filed on Dec. 22, 2000, now Pat. No. 7,054,375.

(51) Int. Cl.
*H04K 1/10*   (2006.01)
(52) U.S. Cl. .................................... 375/260
(58) Field of Classification Search ............... 375/350, 375/349, 348, 232, 233, 260, 261, 222, 226, 375/219, 295, 335
See application file for complete search history.

(56) References Cited

U.S. PATENT DOCUMENTS

| | | | | |
|---|---|---|---|---|
| 5,726,978 A * | 3/1998 | Frodigh et al. | ............. | 370/252 |
| 5,867,478 A | 2/1999 | Baum et al. | | |
| 5,963,592 A * | 10/1999 | Kim | ............................ | 375/232 |
| 5,987,014 A * | 11/1999 | Magill et al. | ................ | 370/335 |
| 6,408,038 B1 * | 6/2002 | Takeuchi | ...................... | 375/341 |
| 6,456,653 B1 * | 9/2002 | Sayeed | ......................... | 375/227 |
| 6,650,617 B1 * | 11/2003 | Belotserkovsky et al. | .. | 370/210 |
| 6,678,310 B1 * | 1/2004 | Andren et al. | ............... | 375/147 |
| 6,771,591 B1 * | 8/2004 | Belotserkovsky et al. | .. | 370/210 |
| 6,990,158 B2 * | 1/2006 | Shan et al. | .................. | 375/346 |
| 2005/0207334 A1 * | 9/2005 | Hadad | .......................... | 370/203 |
| 2006/0056496 A1 * | 3/2006 | Smee et al. | .................. | 375/148 |

OTHER PUBLICATIONS

Lawrey, Eric. Thesis entitled: The suitability of OFDM as a modulation technique for wireless telecommunications, with a CDMA comparison. Oct. 1997, 29 pages. Printed from the Internet at http://www.eng.jcu.au/eric/thesis/Thesis.htm.

Schmidt, Helko et al. Reducing the Peak to Average Power Ratio of Multicarrier Signals by Adaptive Subcarrier Selection. 1998, 14 pages.

(Continued)

*Primary Examiner*—Emmanuel Bayard
(74) *Attorney, Agent, or Firm*—Banner & Witcoff, Ltd.

(57) ABSTRACT

A method and apparatus reduces error in a communication system that includes multiple orthogonal subcarriers by suppressing a subcarrier in a transmitting communication device and by equalizing a received signal in a receiving communication device. Subcarrier suppression is based on a determination of a signal quality metric with respect to each subcarrier or is based on a determination of excessive signal power overdriving an amplifier of the receiving communication device. Equalization of the received signal is based on an equalization function that reduces a multipath delay introduced to the transmitted signal when the multipath delay exceeds a tolerable multipath delay.

11 Claims, 8 Drawing Sheets

OTHER PUBLICATIONS

Radio Channel Impulse Response Measurement Systems. Institute of Telecommunications Sciences (ITS)—Boulder Labs. Jan. 13, 2000, 6 pages. Printed from the Internet at http://flattop.its.bldrdoc.gov/rcirms/index.html.

Welling, Kenneth J. Thesis entitled: Coded Orthogonal Frequency Division Multiplexing on the Narrowband Aeronautical Telemetry Channel. Nov. 1999, 66 pages. Department of Electrical and Computer Engineering, Bringham Young University.

Edfors, Ove et al. OFDM channel estimation by singular value decomposition. 1996, 29 pages.

* cited by examiner

| | $g_{f1}$ | $g_{f2}$ | $g_{f3}$ | ... | $g_{fN_{gf}}$ |
|---|---|---|---|---|---|
| SUBCARRIER 1 | $SNR_1(g_{f1})$ | $SNR_1(g_{f2})$ | $SNR_1(g_{f3})$ | ... | $SNR_1(g_{fN_{gf}})$ |
| SUBCARRIER 2 | $SNR_2(g_{f1})$ | $SNR_2(g_{f2})$ | $SNR_2(g_{f3})$ | ... | $SNR_2(g_{fN_{gf}})$ |
| SUBCARRIER 3 | $SNR_3(g_{f1})$ | $SNR_3(g_{f2})$ | $SNR_3(g_{f3})$ | ... | $SNR_3(g_{fN_{gf}})$ |
| ... | ... | ... | ... | ... | ... |
| SUBCARRIER n | $SNR_n(g_{f1})$ | $SNR_n(g_{f2})$ | $SNR_n(g_{f3})$ | ... | $SNR_n(g_{fN_{gf}})$ |

METHOD AND APPARATUS FOR ERROR REDUCTION IN AN ORTHOGONAL MODULATION SYSTEM

This application is a continuation of common-owned, U.S. application Ser. No. 09/745,301 ("Method and Apparatus for Error Reduction in an Orthogonal Modulation System"), filed on Dec. 22, 2000 now U.S. Pat. No. 7,054,375, naming Anand Kannan and Tamer A. Kadous as inventors.

TECHNICAL FIELD

The present invention relates generally to wireless communication systems and, in particular, to the use of orthogonal modulation schemes to code information in a wireless communication system.

BACKGROUND

The limited availability of bandwidth is a critical constraint on the capacity of wireless communication systems. To enhance capacity, orthogonal modulation schemes, such as Orthogonal Frequency Division Multiplexing (OFDM), have been developed for the modulation of information onto a carrier and subsequent transmission of the modulated signal.

OFDM is a wideband modulation scheme that divides a frequency bandwidth allocated for a communication session into multiple narrower frequency sub-bands. Each sub-band includes a radio frequency (RF) subcarrier, wherein each subcarrier is mathematically orthogonal to the RF subcarrier included in each of the other subchannels. The orthogonality of the subcarriers allows their individual spectra to overlap without causing interference with the other carriers (i.e., intercarrier interference). The division of a frequency bandwidth into multiple orthogonal sub-bands allows for a modulation scheme capable of a high data rate and very efficient bandwidth usage.

An exemplary OFDM communication system 100 is illustrated in FIG. 1. OFDM communication system 100 includes a transmit side 260 (blocks 102-118) and a receive side 262 (blocks 122-136). On the transmit side 260, a data source 102 sources data, typically a bit stream, to an encoder 104. Encoder 104 applies an error correction code, typically a forward error correction code, to the bit stream and conveys the coded bit stream to a symbol mapper 106. Symbol mapper 106 groups the bit stream into groups of P bits (P-tuples) and then maps each P-tuple to one symbol of M possible symbols to produce a symbol stream, wherein $M=2^P$ and each symbol is represented as a point in a constellation of points in a multi-dimensional modulation scheme. Typically a two-dimensional modulation scheme is used, such a multiple phase shift keying (MPSK) or a multiple quadrature amplitude modulation (MQAM) modulation scheme.

Symbol mapper 106 conveys the symbol stream to a serial-to-parallel converter (S/P) 108, such as a demultiplexer. S/P 108 converts the symbol stream from serial to parallel form and applies an output of N parallel symbols, to an orthogonal modulator 110, such as inverse discrete Fourier Transform (IDFT) or an inverse fast Fourier Transform (IFFT) block. Orthogonal modulator 110 modulates each one of the N subcarriers by one of the N symbols, wherein each subcarrier is orthogonal to all other subcarriers, to produce N parallel modulated subcarriers. The N modulated subcarriers are then conveyed by orthogonal modulator 110 to a parallel-to-serial (P/S) converter 112, such as a multiplexer, that combines the N modulated subcarriers to produce an output signal 113. P/S converter 112 conveys output signal 113 to a cyclic prefix (C/P) adder 114 that appends a guard band interval, or cyclic prefix, to the signal to produce output signal 115. Signal 115 is then conveyed to an upconverter 116 that upconverts signal 115 from a baseband frequency to a transmit frequency. The upconverted signal is conveyed to a power amplifier (PA) 118 that amplifies the signal and transmits the amplified signal via an antenna.

The receive side 262 of communication system 100 implements the reverse functions with respect to the transmit side 260. A received signal is routed to a low noise amplifier (LNA) 120 that amplifies the received signal and then to a downconverter 122 that downconverts the amplified signal from a transmit frequency to a baseband frequency. The baseband signal is conveyed to a cyclic prefix (C/P) remover 124 that removes a cyclic prefix that had been appended to the signal. C/P remover 124 conveys the cyclic prefix-less signal to S/P converter 126. S/P converter 126 converts the downconverted, prefix-less signal from a serial to a parallel form, outputting N parallel modulated subcarriers. The N parallel modulated subcarriers are conveyed to an orthogonal demodulator 128, such as a discrete Fourier Transform (DFT) or a fast Fourier Transform (FFT), that demodulates the transmitted information based upon the N orthogonal functions used in orthogonal modulator 110. The output of orthogonal demodulator 128 includes N parallel symbols based on the N modulated subcarriers, wherein each symbol of the N parallel symbols is drawn from the M possible symbols of the constellation used on the transmit side 260.

Orthogonal demodulator 128 conveys the N parallel symbols to a P/S converter 132. P/S converter 132 converts the symbols from a parallel to a serial form to produce a symbol stream and conveys the symbol stream to a inverse symbol mapper 132. Inverse symbol mapper 132 produces a bit stream by recovering the P-tuple corresponding to each symbol based on the symbol mapping scheme used by symbol mapper 108. Inverse symbol mapper 132 then conveys the recovered bit stream to a decoder 134. Decoder 134 decodes the bit stream based on the error correction code applied by encoder 104 and conveys the decoded bit stream to a data sink 136.

The key to bandwidth efficiency of an OFDM system is the orthogonality of the subcarriers. In order to maintain carrier orthogonality, OFDM systems append a guard band interval, of time length $t_g$, to each OFDM symbol. Typically, the guard band interval is a copy of the last $T_g$ seconds of the OFDM symbol and is commonly referred to as a "cyclic prefix." Thus, a transmitted OFDM symbol can generally be viewed as including two intervals, the guard band interval $T_g$ and the OFDM symbol interval $T_s$, so that the entire period of a transmitted symbol is $T_{total}=T_g+T_s$. Use of a guard band interval, or cyclic prefix, reduces spectral efficiency since time is consumed repeating part of the information. Therefore, the length of the guard band interval should be limited. However, in order eliminate intersymbol interference (one symbol transmitted in a sub-band interfering with a succeeding symbol transmitted in the same sub-band), the guard band interval must be at least as long as the multipath delay, or fading, introduced into the system by the propagation environment.

In wireless communication systems, multipath delay can be very unpredictable. Multipath delay in such systems is a random phenomenon, and there are instances where the multipath delay introduced to a transmitted signal in a wireless communication system is not shorter than a preassigned length of the cyclic prefix. OFDM systems are designed for a maximum delay, or $T_g$. Excessive multipath delay in an OFDM system causes a loss of orthogonality among the subcarriers and causes interference among consecutive symbols transmitted in a sub-band, producing an irreducible and unacceptably high error floor, that is, a minimum symbol error rate that cannot be reduced even in a very high signal-to-noise ratio communication.

Therefore, the need exists for a method and apparatus that can reduce error in a transmitted signal and maintain a symbol error rate at an acceptable level under conditions of excessive multipath delay.

SUMMARY

The present invention overcomes many of the foregoing problems and/or disadvantages by providing a method and apparatus that can reduce error in a transmitted signal and maintain a symbol error rate at an acceptable level under conditions of excessive multipath delay. The invention is particularly useful in wireless communication systems having multiple communication devices that each utilizes an orthogonal modulation scheme. In one embodiment, the invention includes a communication device of the multiple communication devices having a receiver that receives a signal that includes multiple orthogonal subcarriers. A signal processing unit coupled to the receiver determines a signal quality metric for each subcarrier of the multiple orthogonal subcarriers and determines subcarrier suppression information based on the determined signal quality metrics. A transmitter coupled to the signal processing unit then transmits the subcarrier suppression information. The subcarrier suppression information can be used by a second communication device of the multiple communication devices to suppress one or more orthogonal subcarriers of multiple orthogonal subcarriers included in a signal transmitted by the second communication device, thereby reducing the signal distortion and splatter that may be introduced to the transmitted signal by the suppressed subcarriers.

In an alternative embodiment of the present invention, wherein a communication channel introduces multipath delay to a transmitted signal, the invention includes a communication device having a receiver coupled to a signal processing unit. The receiver receives a signal comprising multiple orthogonal subcarriers. The signal processing unit determines a transfer function corresponding to the communication channel, determines an equalization function that is based on the determined communication channel transfer function, and processes the signal based on the determined equalization function. The equalization function reduces the multipath when the multipath delay exceeds a tolerable multipath delay, thereby reducing error in the received signal.

In another alternative embodiment of the present invention, in addition to processing a received signal based on a determined equalization function, the communication device further receives another, second signal comprising multiple orthogonal subcarriers and determines subcarrier suppression information based on the second signal.

In still another alternative embodiment of the present invention, wherein a transmitted signal comprises multiple orthogonal subcarriers, the invention combines the use of subcarrier suppression information and an equalization function in order to reduce error in a transmitted signal. A first communication device of multiple communication devices suppresses an orthogonal subcarrier of multiple orthogonal subcarriers based on the subcarrier suppression information to produce transmitted signal that includes suppressed and non-suppressed subcarriers. A second communication device receives the transmitted signal, determines an equalization function that reduces a multipath delay of the received signal, and processes the received signal based on the determined equalization function.

BRIEF DESCRIPTION OF THE DRAWINGS

FIG. 8 is a table illustrating a process of determining an optimal composite equalization function in accordance with an embodiment of the present invention.

DETAILED DESCRIPTION

Figure 1:
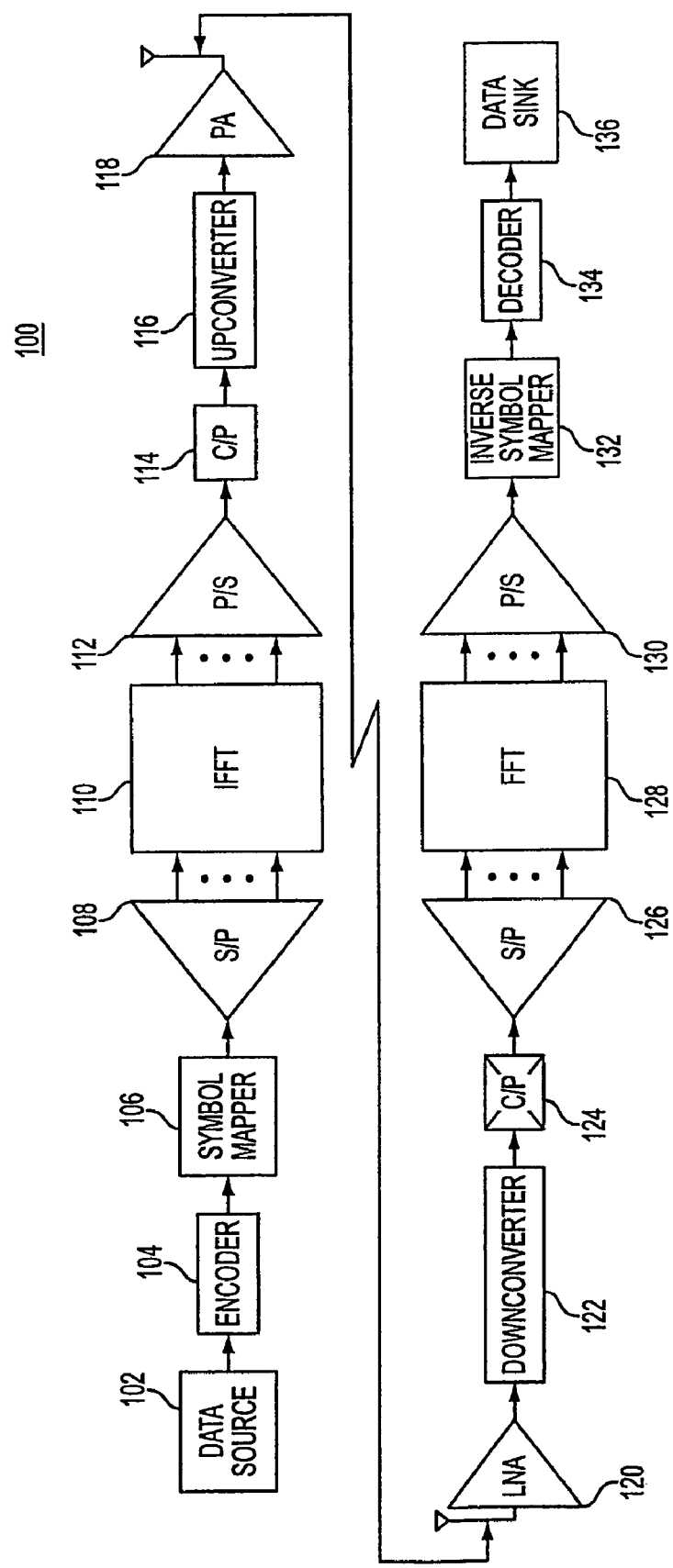
FIG. 1 is a block diagram of an exemplary communication device in accordance with the prior art.
Figure 2:
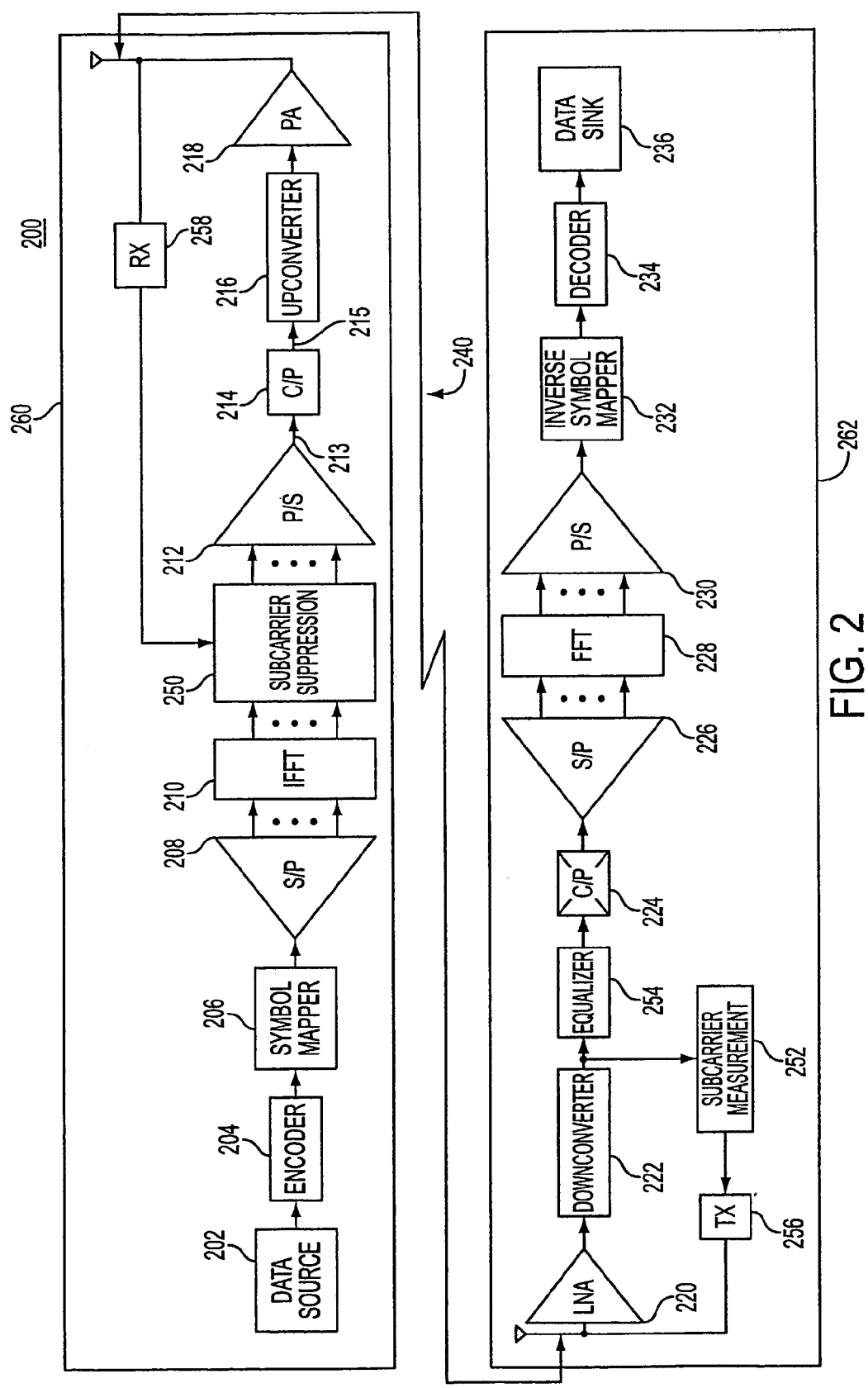
FIG. 2 is a block diagram of a communication system in accordance with an embodiment of the present invention.

The present invention may be more fully described with reference to FIGS. 2-10. FIG. 2 is a block diagram of a communication system 200 in accordance with an embodiment of the present invention. Communication system 200 includes a transmit side 260 and a receive side 262, as shown. Communication system 200 maybe, for example, a cellular telephone system in which the transmit side 260 is embodied within a cell phone or other type of subscriber radio unit, and the receive side 262 is embodied within a base station or other fixed receiving equipment, or vice versa. Further still, transmit side 260 and receive side 262 may be embodied within separate subscriber units, respectively, or within separate base stations, respectively. Of course, the present invention may be beneficially applied to other types of communication systems, particularly wireless communication systems.

Figure 3:
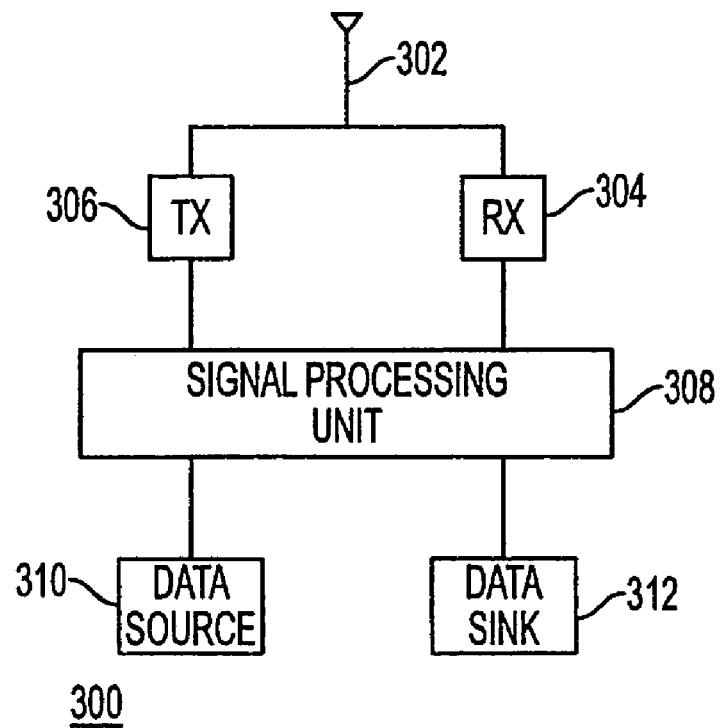
FIG. 3 is a block diagram of a communication device in accordance with an embodiment of the present invention.

FIG. 3 is a block diagram of a communication device 300 capable of operating in communication system 200 in accordance with an embodiment of the present invention. Communication device 300 can be any communication device capable of engaging in a wireless OFDM communication, such as but not limited to a cellular telephone or a base station. Preferably, communication device 300 is capable of operating on either of transmit side 260 or receive side 262 of communication system 200, that is, is capable of being a transmitting communication device or a receiving communication device. Communication device 300 includes an antenna 302 that is coupled to each of a receiver 304 and a transmitter 306. Receiver 304 and transmitter 306 are further coupled to a signal processing unit 308, which signal processing unit 308 is further coupled to each of a data source 310 and a data sink 312. Preferably transmitter 306 includes an upconverter 216 and a power amplifier 218 and performs functions of a transmitter 256, receiver 304 includes a low noise amplifier 220 and a downconverter 222 and performs functions of a receiver 258, and signal processing unit 308 performs the functions of each of blocks 204-214, 224-234, and 250-254 as described below with respect to FIG. 2, which functions are performed by either a transmitting communication device or a receiving communication device, whichever is appropriate. As those skilled in the art are aware, the various functions of signal processing unit 308 as described herein may be implemented in hardware circuitry, such as a programmable logic array (PLA) or an application specific integrated circuit (ASIC). Alternatively, as those skilled in the art are further aware, the functions of one or more of blocks 204-214, 224-234, and 250-254 may be implemented in signal processing unit 308 by software executed by a processor, such as a microprocessor or a digital signal processor (DSP), that executes instructions and programs that are stored in an associated memory.

In communication device 300, data source 310 provides user information, preferably data in a binary form, to signal processing unit 308, which user information may include virtually anything capable of being represented in a digital format including, but not limited to, voice and image data. For example, data source 310 may be an analog-to-digital converter (A/D) that converts analog user information received from a user of communication device 300 to a digital format. Alternatively, data source 310 may be included in signal processing unit 308, such as an application executed by signal processing unit 308. Similarly, data sink 312 may be a digital-to-analog converter (D/A) that converts digital information received from signal processing unit 308 to an analog format for subsequent transmission to a user of communication device 300. Alternatively, data sink 312 may be an application that is executed by signal processing unit 308 and that is the intended destination of information received by device 300.

On transmit side 260, a data source 202, such as data source 310, provides user information, preferably data in a binary form, to an encoder 204. Encoder 204 applies an error correcting code, preferably a forward error correction code (FEC), to the data. Preferably, encoder 204 encodes the data by use of a convolutional code such as a Viterbi coding algorithm; however, in the alternative, a block code may be used. Convolutional codes and block codes are well known in the art and will not be described in greater detail. The type of error correcting code used is not critical to the invention and those of ordinary skill in the art are aware of many types of error correction codes that may be applied to the data without departing from the spirit and scope of the present invention. Regardless, the output of encoder 204 includes information preferably represented in a binary data (bits) format.

A bit stream output by encoder 204 is then provided to a symbol mapper 206. Symbol mapper 206 groups the bit stream into groups of P bits (P-tuples) and maps each P-tuple to a corresponding symbol to produce a symbol stream. To this end, a signal constellation that includes M possible symbols is defined within a multi-dimensional space, preferably a complex two-dimensional (I,Q) space. Each symbol comprises a point within the two-dimensional space, which point may be thought of as a vector sum of two scaled basis vectors. The respective amplitudes of the two basis vectors used to define a particular point may be thought of as two-dimensional coordinates of the point. In order to achieve the desired mapping, symbol mapper 206 assembles the binary values (bits) output by encoder 204 into a P-tuple. Each P-tuple is then used to select a symbol out of the M possible symbols, wherein $M=2^P$. In one embodiment, a MPSK modulation scheme, such as BPSK or QPSK, is applied to each P-tuple; however those who are of ordinary skill in the art realize that there are many types of multi-dimensional symbol mapping schemes, such as other MPSK schemes or a multiple quadrature amplitude modulation (MQAM) scheme, that may be used without departing from the spirit and scope of the present invention.

Communication system 200 may include an interleaving block on transmit side 260, and a corresponding inverse interleaving block on receive side 262, that interleaves the symbols produced by the symbol mapper 206 in order to minimize the error producing impact of a bursty channel. In one embodiment of the present invention, block interleaving may be used wherein the symbol stream is read into the rows of a two-dimensional matrix and read out column-wise, resulting in the separation of any two adjacent symbols in the symbol stream. When the transmitted symbols are received and deinterleaved by the inverse interleaving block, any error bursts introduced by the channel are broken up, reducing the impact of the error and augmenting the ability of the forward error correction code to correct such errors.

Symbol mapper 206 conveys the symbol stream to an S/P converter 208. In one embodiment of the present invention, S/P converter 208 converts the symbol stream from a serial to a parallel form, producing N parallel symbols wherein N is the number of subcarriers contained in a frequency bandwidth allocated for a communication session. S/P converter 208 then applies the N parallel symbols to an orthogonal modulator 210. Alternatively, when fewer than the N subcarriers are modulated by orthogonal modulator 210, S/P converter 208 produces a quantity of parallel symbols corresponding to a quantity of subcarriers modulated by the orthogonal modulator.

Orthogonal modulator 210 modulates each subcarrier of N orthogonal subcarriers by a symbol of the N parallel symbols, wherein each subcarrier corresponds to a sub-band included in the frequency band. The multiple orthogonal subcarriers $\Phi_n(t)$, n=0, 1, ..., N−1 can be thought of as sinusoids or complex exponentials of the form $e^{j2\pi(W/N)nt}$ for $t \in [0, T_{total}]$ where W is the available frequency bandwidth and W/N expresses the frequency spacing between subcarriers. As used throughout, orthogonal functions form a linearly independent set of functions (i.e., the individual functions are not dependent on each other). Expressed another way, orthogonality results where the cross correlation of respective pairs of functions is zero over a given time interval.

As known in OFDM systems, the functionality of orthogonal modulator 210 may be implemented with an inverse fast Fourier transform (IFFT), or alternatively with an inverse discrete Fourier transform (IDFT). The N parallel symbols are provided as input to the IFFT and the IFFT outputs N parallel subcarriers $\Phi_n$, wherein each subcarrier of the N parallel subcarriers is modulated by a corresponding input symbol of the N parallel input symbols. The modulated subcarriers constituting the IFFT output are then conveyed to a subcarrier suppression block 250. When indicated by the subcarrier suppression information and as described in greater detail below, subcarrier suppression block 250 suppresses one or more subcarriers and conveys both the suppressed subcarriers and the non-suppressed subcarriers, or alternatively only the non-suppressed subcarriers, to a parallel-to-serial (P/S) converter 212.

In another embodiment of the present invention, subcarrier suppression block 250 may be included in orthogonal modulator 210. When included in orthogonal modulator 210, subcarrier suppression block 250 suppresses one or more subcarriers, that is, $N_s$ subcarriers, prior to the N subcarriers being modulated with symbols by orthogonal modulator 210. The input symbols are then modulated onto the remaining, non-suppressed subcarriers, that is, onto $N_{ns}$ subcarriers wherein $N_{ns}=N-N_s$. In this embodiment, S/P converter 208 converts the symbol stream from a serial to a parallel form, producing $N_{ns}$ parallel symbols and then applies the $N_{ns}$ parallel symbols to orthogonal modulator 210. Orthogonal modulator 210 modulates each subcarrier of the $N_{ns}$ non-suppressed orthogonal subcarriers by a symbol of the $N_{ns}$ parallel symbols, and conveys the $N_s$ unmodulated, suppressed subcarriers and the $N_{ns}$ modulated, non-suppressed subcarriers, or alternatively only the $N_{ns}$ non-suppressed subcarrier, to P/S converter 212.

In the present invention, subcarrier suppression block 250 provides a first layer of error reduction, reducing the error rate resulting from multipath fading in an unpredictable propagation environment by suppressing one or more subcarriers. For example, a subcarrier may be suppressed to reduce errors in the processing of a received OFDM signal resulting from excessive signal distortion of the subcarrier during transmission from a transmitting communication device to a receiving communication device and potential coupling of power into the frequencies of nearby subcarriers. In the present invention, a subcarrier measurement block 252 of a receiving communication device determines a signal quality metric, such as a signal power measurement, a signal-to-noise ratio (SNR), or a bit error rate (BER), with respect to each subcarrier included in a received OFDM signal. The OFDM signal may be a user information bearing signal, or alternatively may be a training signal, a pilot signal, or a control signal that is transmitted for a respective purpose of system training, synchronization, or control. Subcarrier measurement block 252 of the receiving communication device then determines subcarrier suppression information based on the determined signal quality metrics. The receiving communication device conveys the determined subcarrier suppression information via transmitter 256 to the transmitting communication device. A subcarrier suppression block 250 of the transmitting communication device receives the subcarrier suppression information via receiver 258 and, when indicated by the received subcarrier suppression information, suppresses one or more subcarriers with respect to a subsequent transmission.

In one embodiment of the present invention, subcarrier suppression block 250 suppresses subcarriers whose corresponding signal quality metrics compare unfavorably with a signal quality metric threshold. The comparison is performed by a receiving communication device that receives an OFDM transmission from a transmitting communication device. Upon receiving the OFDM transmission, a subcarrier measurement block 252 of the receiving communication device determines a signal quality metric for each subcarrier. For example, the signal quality metric may be a signal power measurement for each subcarrier, or may be a signal-to-noise ratio (SNR) for each subcarrier. Subcarrier measurement block 252 then compares each determined signal quality metric to a signal quality metric threshold, such as a minimum acceptable SNR or a minimum acceptable subcarrier signal power, that is stored in a memory associated with a signal processing unit 308 of the receiving communication device. The receiving communication device then conveys subcarrier suppression information based on the comparison to the transmitting communication device. Alternatively, the subcarrier suppression information may comprise the determined signal quality metrics and a comparison of each signal quality metric to a signal quality metric threshold may be performed by the transmitting communication device. When a comparison of a signal quality metric to the signal quality metric threshold yields an unacceptable result, such as a determined SNR that is below the SNR threshold or a determined signal power level that is below the signal power level threshold, the subcarrier suppression block 250 of the transmitting communication device suppresses the corresponding subcarrier in subsequent transmissions to the receiving communication device. Preferably, the subcarrier suppression block 250 suppresses the subcarrier by modulating the subcarrier by a factor of zero; however, those who are of ordinary skill in the art realize that there are other means for suppressing a subcarrier, such as dropping or blocking the subcarrier. The modulation of the subcarrier by a factor of zero results in a null at the frequency of the subcarrier in the frequency spectrum of the subcarriers transmitted by the transmitting communication device.

In another embodiment of the present invention, the subcarrier measurement block 252 of the receiving communication device determines a signal quality metric for each subcarrier and hierarchically orders the subcarriers based upon the determined signal quality metrics. The subcarrier suppression information then includes the order of the subcarriers, or alternatively information concerning a predetermined number of the worst performing subcarriers based on the order, that are conveyed to the transmitting communication device. Alternatively, the subcarrier suppression information may include the determined signal quality metrics and the hierarchical ordering may be performed by the subcarrier suppression block 250 of the transmitting communication device. The subcarrier suppression block 250 of the transmitting communication device then suppresses each of a predetermined number of subcarriers with the worst signal quality metrics in subsequent transmissions to the receiving communication device.

In yet another embodiment of the present invention, communication system 200 may suppress one or more subcarriers when a peak-to-average power ratio of a received signal exceeds a peak-to-average power ratio threshold. In this embodiment, the transmitting communication device transmits an OFDM signal, preferably a training signal or a control signal, to the receiving communication device. Subcarrier measurement block 252 of the receiving communication device then determines a peak-to-average power ratio for the received signal and compares the determined peak-to-average power ratio to a peak-to-average power ratio threshold. When the determined peak-to-average power ratio exceeds a peak-to-average power ratio threshold, signal processing unit 308 of the receiving communication device determines a quantity of subcarriers that may be suppressed in order to reduce a peak-to-average power ratio below the threshold. The receiving communication device transmits subcarrier suppression information that includes the determined quantity to the transmitting communication device, and subcarrier suppression block 250 of the transmitting communication device suppresses the determined quantity of subcarriers in subsequent transmissions to the receiving communication device. Alternatively, the comparison of the determined peak-to-average power ratio to a peak-to-average power ratio threshold, the determination of a quantity of subcarriers that may be suppressed in order to reduce a peak-to-average power ratio below the threshold, or both the comparison and determination may be performed by a signal processing unit 308 of the transmitting communication device.

Those who are of ordinary skill in the art realize that many methods exist for determining the subcarriers to suppress based on the peak-to-average power ratio comparison. In one embodiment, subcarrier measurement block 252 of the receiving communication device also determines a signal quality metric for each subcarrier as described above, and subcarrier suppression block 250 of the transmitting communication device suppresses subcarriers with the most unfavorable signal quality metrics. In another embodiment, subcarrier suppression block 250 suppresses subcarriers in a predetermined order until suppressing the determined quantity of subcarriers. In still another embodiment, as proposed by Schmidt and Kammeyer in a presentation "Adaptive Subcarrier Selection" at the ICUPC Conference in Florence in 1998, a determination of a quantity of suppressed subcarriers is based on a subcarrier reduction function, such as a sliding scale, whereby the greater the difference between the determined peak-to-average power ratio and the peak-to-average power ratio threshold (when the former is greater than the latter), the greater the quantity of suppressed subcarriers. The subcarrier reduction function may be applied to a single training or control signal to determine a total quantity of subcarriers to suppress, or the subcarrier reduction function may be applied to each of multiple training or control signals during an iterative process, that is, the transmitting communication device transmits a second, third, etc., training or control signal, wherein the quantity of suppressed subcarriers is adjusted for each successive transmission until a determined peak-to-average power ratio falls below the peak-to-average power ratio threshold. In yet another embodiment, instead of applying a subcarrier reduction function, the iterative process may include a suppression of a predetermined quantity of subcarriers in each iteration until a determined peak-to-average power ratio falls below the peak-to-average power ratio threshold.

P/S converter 212, preferably a multiplexer, converts the subcarriers received from subcarrier suppression block 250, or alternatively from orthogonal modulator 210, from a parallel form to a serial form to produce an output signal 513. P/S converter 212 conveys output signal 213 to a cyclic prefix (C/P) adder 214 that appends a guard band interval, or cyclic prefix, to signal 213 to produce output signal 215. Typically, the appending of a cyclic prefix comprises an appending of the last $T_g$ seconds of each OFDM symbol as a prefix to itself. Preferably $T_g$ is a preassigned length of 16 taps, or 0.8 μs; however, those of ordinary skill in the art realize that the preassigned length of the cyclic prefix is up to the designer of the system as the designer weighs the greater protection afforded by a longer cyclic prefix against the inefficiency of a longer prefix. Other factors that may be considered by a system designer in the selection of a cyclic prefix length are the requirements of existing technical standards or markets and component reuse in designing separate indoor and outdoor systems. The length of the cyclic prefix constitutes a maximum multipath delay that can be experienced by communication system 200 before multipath delay causes intersymbol interference (ISI) between consecutively transmitted symbols in an orthogonal subcarrier. However, those who are of ordinary skill in the art realize that a system such as system 200 may tolerate a limited amount of intersymbol interference and may therefore tolerate a multipath delay that exceeds the length of the cyclic prefix.

C/P adder 214 conveys output signal 215 to an upconverter 216 that upconverts signal 215 from a baseband frequency to a transmit frequency. The upconverted signal is conveyed to power amplifier (PA) 218 that amplifies the signal and transmits the amplified signal via an antenna.

On receive side 262 of communication system 200, an antenna receives the transmitted signal. The transmitted signal is routed to a low noise amplifier (LNA) 220 that amplifies the received signal and then to a downconverter 222 that downconverts the received and amplified signal from a transmit frequency to a baseband frequency. Downconverter 222 then conveys the downconverted signal to an equalizer 254.

Figure 4:
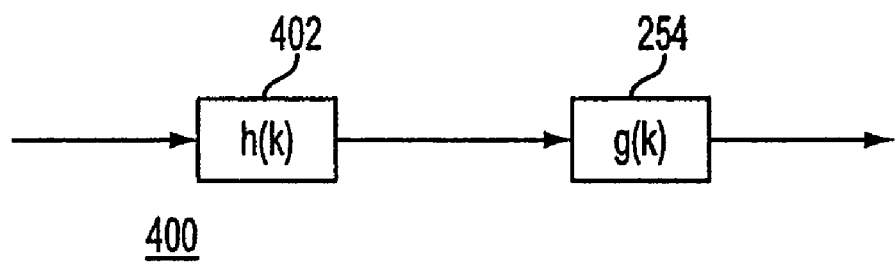
FIG. 4 is a block diagram of a composite communication channel in accordance with an embodiment of the present invention.

In a communication system that includes a communication channel 240 with an invariant propagation environment, wherein the impulse response of communication channel 240 is known to be less than the length of the cyclic prefix, the appending of a cyclic prefix essentially guarantees the orthogonality of the OFDM symbols. However, in a communication system with an unpredictable propagation environment such as a wireless propagation environment, multipath fading can exceed the length of the cyclic prefix and cause a loss of orthogonality of the subcarriers. In the present invention, equalizer 254 provides a second layer of error reduction by providing compensation for excessive multipath delay, that is, for delay in excess of a tolerable multipath delay such as a length of the cyclic prefix, which excessive delay is introduced into the received signal by the propagation environment and by receive side 262 of the communication device prior to the equalizer. FIG. 4 is a block diagram of a composite communication channel 400 that includes equalizer 254 and a communication channel 402 that precedes the equalizer, wherein g(k) and h(k) are unit pulse responses corresponding to the equalizer and the communication channel, respectively. Communication channel 402 includes communication channel 240 and further includes receive side 262 of the receiving communication device prior to equalizer 254 (i.e., a receiving antenna, LNA 220, and downconverter 222). The task of equalizer 254 is to produce a composite communication channel 400, that is, h(k) * g(k) (h(k) convolved with g(k)), that appears to be a communication channel of a tolerable multipath delay to the receiving communication device, regardless of the multipath delay of a propagation environment (i.e., communication channel 402). A tolerable multipath delay is a delay that yields an acceptable level of intersymbol interference. Preferably, composite communication channel 400 appears to be a communication channel with a multipath delay of, at most, a length of the cyclic prefix (i.e., 16 taps, wherein each tap corresponds to a sampling of a signal, and at a sampling rate of 20 MHz 16 taps corresponds to a delay of 0.8 μs), although, in the alternative, the design of composite communication channel 400 may be oriented to any tolerable multipath delay.

The mathematical representation of a communication channel, such as communication channel 402, as a digital finite impulse response (FIR) filter is well known in the art. For example, communication channel 402 can be repre sented in z-transformation format as a transfer function, or FIR filter, $$H(z) = \sum_{i=0}^{I} h_i z^{-i},$$

or can be represented by a corresponding vector H=[h(0) h(1) . . . h(I)], wherein each of h(0), h(1), . . . , h(I) is a coefficient of the z-transformation representation. When digitally implementing the FIR filter H(z), each coefficient h(i), i=0, 1, . . . , I, corresponds to a tap in the filter and 'I' corresponds to a number of taps in the filter, which number of taps may exceed the preferred maximum tolerable number of 16. In the present invention, equalizer 254 is an equalization function that can be represented as a transfer function, or FIR filter, $$G(z) = \sum_{i=0}^{J} g_i z^{-i},$$

or can be represented by a corresponding coefficient vector G=[g(0) g(1) . . . g(J)], wherein each coefficient g(i), i= 1, . . . , J corresponds to a tap in the filter G(z) and 'J' corresponds to a number of taps in the equalizer. In the present invention, an equalizer G(z) has a suitable number of taps 'J' such that when I>16, the convolution of g(k) with h(k) produces a composite communication channel with a delay of less than or equal to 16 taps. That is, a unit pulse response of the composite communication channel, l(k), can be represented as:

$$l(k) = h(k) * g(k) (h(k) \text{ convolved with } g(k))$$
$$= \sum_{i=0}^{I+J-1} h(i) g(k-i)$$
$$= \sum_{k=0}^{i} h(i) g(k-i) \text{ for } i = 0, 2, \ldots, I+J-1$$
$$= [l(0) l(1) \ldots l(I+J-1)]$$

wherein $$l(i) = 0 \text{ for } i \geq 17$$

Preferably, equalizer 254 (i.e., G(z)) is determined by signal processing unit 308 of the receiving communication device as follows. The filter H(z) may be approximated by an Auto-Regressive Moving Average (ARMA) filter H(z) =B(z)/A(z), wherein neither A(z) nor B(z) are equal to 1. It is apparent that when B(z) may be implemented using no more than 16 taps (the requirement for the composite communication channel), then A(z) is the desired equalizer 254 for communication channel 402, i.e., H(z), since H(z) ·A(z)=B(z) and B(z) is then a z-transformation representation of the composite communication channel.

Many methods are known in the art whereby signal processing unit 308 can determine a channel transfer function H(z) based on a receipt of a known pilot or training signal. For example, a simple method of estimating a channel transfer function comprises a transmitting communication device transmitting an OFDM symbol known to a receiving communication device. Upon receipt of the symbol, the receiving communication device estimates the channel transfer function by dividing the frequency response of the received signal by the frequency response of the known OFDM symbol. Another example of determining a channel transfer function is proposed by the Institute of Telecommunications Sciences (ITS), National Telecommunications and Information Administration, U.S. Department of Commerce. A transmitting communication device modulates a radio frequency (RF) carrier with a pseudo-random noise (PN) code known to a receiving communication device to produce a binary phase-shift keyed (BPSK) signal. A signal processing unit 308 of the receiving communication device downconverts the received signal to produce baseband in-phase and quadrature-phase signals. The signal processing unit 308 then samples the in-phase and quadrature-phase signals and correlates the sampled signal with the known PN code to determine a unit pulse response of the channel and a channel transfer function.

Still another example of determining a channel transfer function is described by Kenneth Welling in his masters thesis "Coded Orthogonal Frequency Division Multiplexing on the Narrowband Aeronautical Telemetry Channel," Department of Electrical and Computer Engineering of Brigham Young University, November, 1999. A two-ray model of a communication channel assumes a line-of-sight path and a single reflected path and has an impulse response $h(t)=*(t)-\mathrm{э}e^{j(*}(t-\theta)$, wherein э, (, and θ respectively are the attenuation, phase, and delay of the reflected path relative to the line-of-sight path. A Fourier transformation representation of the impulse response is $H(f)=1+\mathrm{э}e^{-j(2Bf\theta-(\ )}$. A three-ray model assumes a line-of-sight path, a single strong reflected path, and a second weaker reflected path and has an impulse response $h(t)=*(t)-\mathrm{э}_1 e^{j((1)}*(t-\theta_1)-\mathrm{э}_2 e^{j((2)}*(t-\theta_2)$, wherein $\mathrm{э}_1$, ((1), and $\theta_1$ (or θ(1)) respectively are the attenuation, phase, and delay of the strong reflected path relative to the line-of-sight path and $\mathrm{э}_2$, ((2), and $\theta_2$ (or θ(2)) respectively are the attenuation, phase, and delay of the weaker reflected path relative to the line-of-sight path. A Fourier transformation representation of the impulse response is $H(f)=1+\mathrm{э}_1 e^{-j(2Bf\theta(1)-((1))}+\mathrm{э}_2 e^{-j(2Bf\theta(2)-((2))}$. The parameters э, (, θ, $\mathrm{э}_1$, ((1), $\theta_1$, $\mathrm{э}_2$, ((2), and $\theta_2$ can each be empirically determined by transmitting, via a communication channel, an RF carrier modulated by a bipolar NRZ PN sequence of predetermined length known to a receiving communication device. A signal processing unit 308 of the receiving communication device downconverts the received signal and computes a cross correlation between the downconverted received signal and the known PN sequence, and based on the cross correlation is able to determine the parameters. Those who are of ordinary skill in the art realize the any of the above impulse responses or Fourier transformation representations of the impulse responses may be easily converted to an FIR representation of a channel transfer function.

Once H(z) is determined, then an A(z) is determined such that H(z)·A(z)=B(z) wherein B(z) has no more than 16 taps. There are many methods known in the art for determining A(z). For example, as proposed by Thomas W. Parks and C. S. Burrus, in their textbook *Digital Filter Design*, N.Y., John Wiley & Sons, 1987, pp. 226-228, ISBN 0471828963, and by Peter Melsa, Richard Younce, and Charles Rohrs in their article "Impulse Response Shortening for Discrete Multi tone Transceivers", IEEE Transactions on Communications, Vol. 44, No. 12, December, 1996, let $$A(z)=1+a_1z^{-1}+a_2z^{-2}+\ldots+a_{Nd}z^{-Nd}, \text{ and}$$

$$B(z)=b_0+b_1z^{-1}+\ldots+b_{16}z^{-16}.$$

Then the equation $B(z)=H(z)\cdot A(z)$ may be written in a matrix format as follows:

$$b = \begin{bmatrix} b(0) \\ b(1) \\ \vdots \\ b(16) \\ 0 \\ \vdots \\ 0 \end{bmatrix} = \begin{bmatrix} h(0) & 0 & 0 & \ldots & 0 \\ h(1) & h(0) & 0 & \ldots & 0 \\ h(2) & h(1) & h(0) & \ldots & 0 \\ \vdots & h(2) & \ddots & \ddots & \vdots \\ h(I) & \ddots & \ddots & h(1) & h(0) \\ 0 & \ddots & \ddots & h(2) & h(1) \\ \vdots & 0 & h(I) & \ldots & \ldots \end{bmatrix} \begin{bmatrix} 1 \\ a(1) \\ a(2) \\ \vdots \\ a(N_d) \end{bmatrix} = Ha$$

wherein $N_d$ (unrelated to 'N' above) is a length of a vector a that corresponds to the desired equalizer $A(z)$ and b is a vector of length $N_d$ but wherein the value in each of rows 17 through $N_d$ of the vector b is zero, thereby meeting the requirements for the desired composite communication channel. '$N_e$' is the number of zeros inserted into vector b, that is, $N_e=N_d-16$, wherein '16' corresponds to a preferred maximum number of taps, or delay. Preferably, $N_d$ is approximately as long as the longest multipath delay that may be experienced by a transmitted signal in communication system 200 and is determined by empirical study. In the present invention, empirical studies have indicated that an acceptable value for $N_d$ is 25. Alternatively, empirical studies have further indicated that a value for $N_e$ as large as 24 will also provide good performance.

In order to compute the vector a, matrices $H_1$ and $H_2$ and a vector z are determined. The matrix $H_1$ consists of rows 1 through 16 of the matrix H (i.e., $H_1$ is a matrix of dimensions '16×$N_d$'). The matrix $H_2$ consists of columns 2 through $N_d$ of each of rows 17 through '$N_e+16$' of the matrix H (i.e., $H_2$ is a matrix of dimensions '$N_e \times (N_d-1)$'). Vector z consists of the first column of each of rows 17 through '$N_e+16$' of the matrix H (i.e., z is a vector of dimensions '$N_e \times 1$'). The pseudo-inverse matrix of $H_2$, that is, $H_2^\#$, is then determined based on $H_2$. Methods of computation of pseudo-inverse matrices are well known in the art of linear algebra and will not be described in detail herein.

The vector a, that is, vector $a^* = [a(1)\ a(2)\ \ldots\ a(N_d)]$, can then be determined based on the matrix $H_2^\#$ and the vector z, wherein each of $a_1\ a_2\ \ldots\ a_{Nd}$ are determined based on the equation $a=-(H_2^\#)z$. Equalizer 254, i.e., $g(k)$, can then be represented by a vector g that is implemented by implementing the taps provided as follows:

$$g = \begin{bmatrix} 1 \\ a^* \end{bmatrix}.$$

The result of implementing the equalizer g is the creation of composite communication channel $h(k) * g(k)$ that reduces a multipath delay of a signal transmitted in the channel when the multipath delay of the signal exceeds a length of a tolerable multipath delay, preferably the length of a cyclic prefix appended to the signal (i.e., the cyclic prefix, $T_g$). Preferably excessive multipath delay is reduced by equalizer 254 to the length of the cyclic prefix; however, in the alternative, the reduction may be something less due to equalizer 254 being of only finite length. By reducing multipath delay introduced to a transmitted signal when the delay introduced is excessive, the present invention reduces the level of intersymbol interference (ISI), thereby reducing a bit rate error and protecting the orthogonality of the subcarriers.

Those of ordinary skill in the art will realize that the method of equalization described in the present invention applies just as well to a communication system that is designed for tolerable delays and cyclic prefixes of lengths other than 16 taps. A designer of such a system may replace the number '16' in the above description of equalizer 254 with any number of taps corresponding to the level of protection from intersymbol interference due to multipath delay that the designer feels is appropriate. The use of '16' taps, or 0.8 μs, in the above description of the invention is merely meant to illustrate the principles of the present invention in accordance with a typical OFDM system and is not intended to limit the invention in any way.

The signal produced by equalizer 254 is then conveyed to a cyclic prefix (C/P) remover 224 that removes the cyclic prefix that had been appended to the signal by C/P adder 214. C/P remover 224 conveys the cyclic prefix-less signal to S/P converter 226. S/P converter 226 converts the cyclic prefix-less signal from a serial form to a parallel form, outputting multiple parallel modulated subcarriers. The multiple parallel modulated subcarriers are then routed to an orthogonal demodulator 228, such as a discrete Fourier Transform (DFT) or a fast Fourier Transform (FFT), that demodulates the transmitted information based upon the multiple orthogonal functions used in orthogonal modulator 210. The output of orthogonal demodulator 228 includes multiple parallel symbols based on the multiple modulated subcarriers, wherein each symbol of the multiple parallel symbols is drawn from the M possible symbols of the constellation used on transmit side 260.

Orthogonal demodulator 228 conveys the multiple parallel symbols to a P/S converter 232. P/S converter 232 converts the symbols from a parallel form to a serial form to produce a symbol stream and conveys the symbol stream to an inverse symbol mapper 232. Inverse symbol mapper 232 takes as input a given symbol from the signal constellation and translates it into a group of $\log_2$ (M) binary values, or bits, suitable for input to a decoder 234. The bits produced by inverse symbol mapper 232 are then conveyed to decoder 234. Decoder 234, in turn, decodes the bit stream based on the error correction code to provide received data to a suitable data sink 236, such as data sink 312, which received data is optimally free of errors. The operations performed by decoder 236 are the inverse operations of encoder 204 and depend on the particular type of encoding used. For example, where a Viterbi coding algorithm is used, the present invention preferably incorporates a Viterbi decoder. Likewise, where a block code is used, a block decoder is employed.

In general, the present invention provides a method and an apparatus for error reduction in a communication system that utilizes an orthogonal multi-carrier modulation scheme, wherein user information is transmitted from a transmitting communication device to a receiving communication device via multiple orthogonal subcarriers. The invention provides a first layer of error reduction by providing for the suppression of one or more subcarriers that may cause distortion of a transmitted signal. In one embodiment, a signal quality metric is determined for each subcarrier to produce multiple signal quality metrics, and each signal quality metric of the multiple signal quality metrics is then compared to a signal quality metric threshold. Those signal quality metrics that compare unfavorably with the threshold correspond to undesirable subcarriers, and the undesirable subcarriers are then suppressed with respect to subsequently transmitted signals. In another embodiment of the present invention, the subcarriers are ordered based on their corresponding signal quality metrics, and a predetermined number of subcarriers with the worst signal quality metrics are then suppressed with respect to subsequently transmitted signals. In still another embodiment of the present invention, a signal power of a transmitted signal is used to determine a quantity of subcarriers that need to be suppressed in order to reduce the signal power to an acceptable level, preferably a level that does not overdrive a receiving communication device amplifier. The determined quantity of subcarriers is then suppressed with respect to subsequently transmitted signals.

The invention further provides a second layer of error reduction, which may or may not be used in conjunction with the first layer of error detection, by providing for the equalization of a received signal. In wireless communication systems, the randomness of the propagation environment can cause multipath delays that exceed a maximum multipath delay that the communication system is designed to tolerate, such as the length of a cyclic prefix in an OFDM system. Excessive multipath delay can cause intersymbol interference and can result in an unacceptable high error floor. The present invention provides an equalizer that reduces an excessive multipath delay of a received signal to a tolerable delay level.

Figure 5:
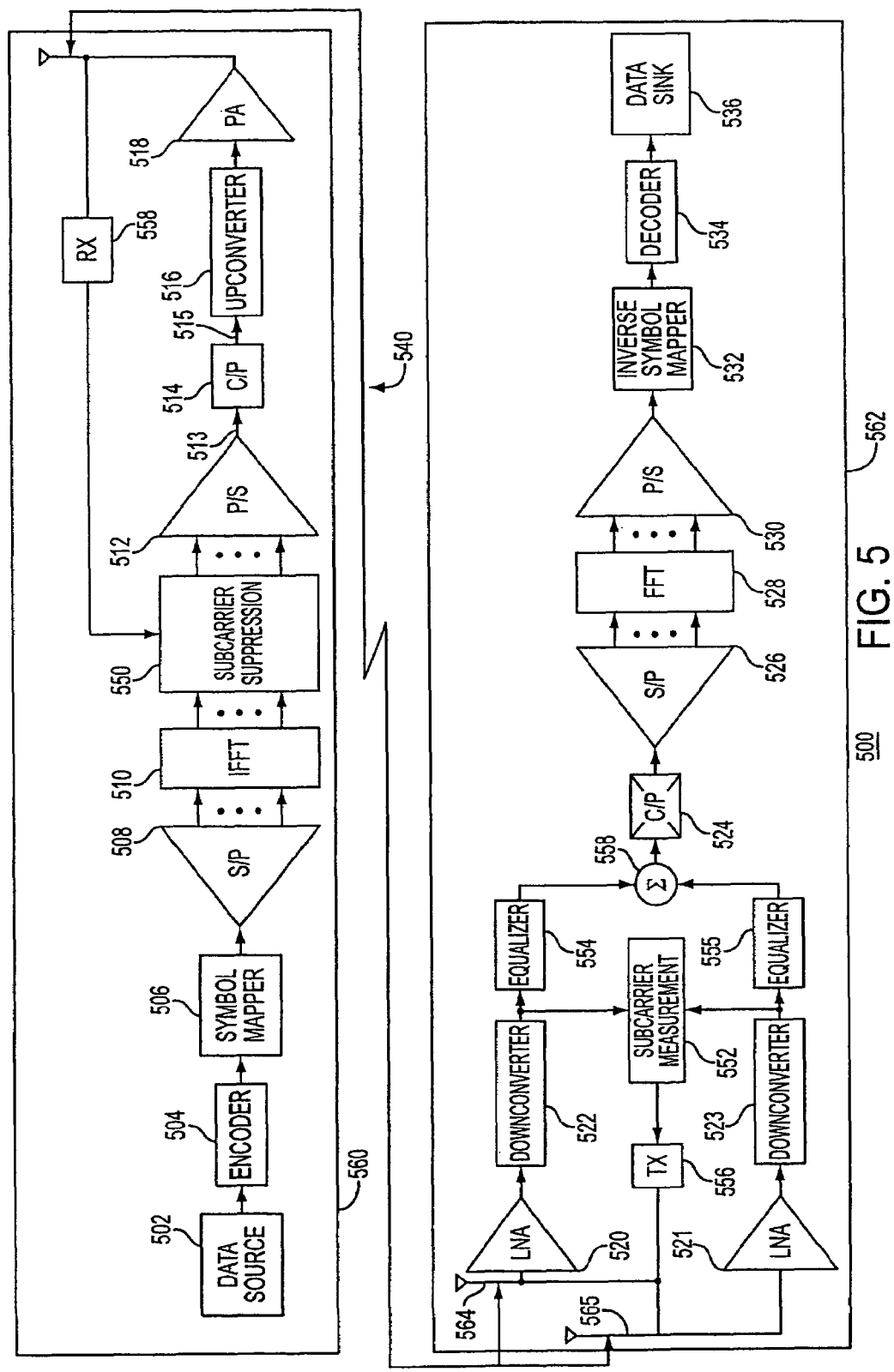
FIG. 5 is a block diagram of a communication system in accordance with another embodiment of the present invention.

FIG. 5 is a block diagram of a communication system 500 in accordance with another embodiment, a "multiple antenna" embodiment, of the present invention. In the multiple antenna embodiment, a transmit side 560 of communication system 500 includes at least one antenna and a receive side 562 of communication system 500 includes multiple antennas 564, 565 (two shown). By including multiple antennas 564, 565 in receive side 562 and by providing a separate equalizer 554, 555 in association with each antenna, intersymbol interference may be reduced beyond the levels attainable with a single receiving antenna. Although communication system 500 is shown including one antenna on transmit side 560 and two antennas on receive side 562, those who are of ordinary skill in the art realize that communication system 500 may have one or multiple antennas on transmit side 560, or at the transmitting communication device, and may have any number of antennas on receive side 562, or at the receiving communication device, and that the description provided below may be extended to any such communication system or communication device.

Figure 6:
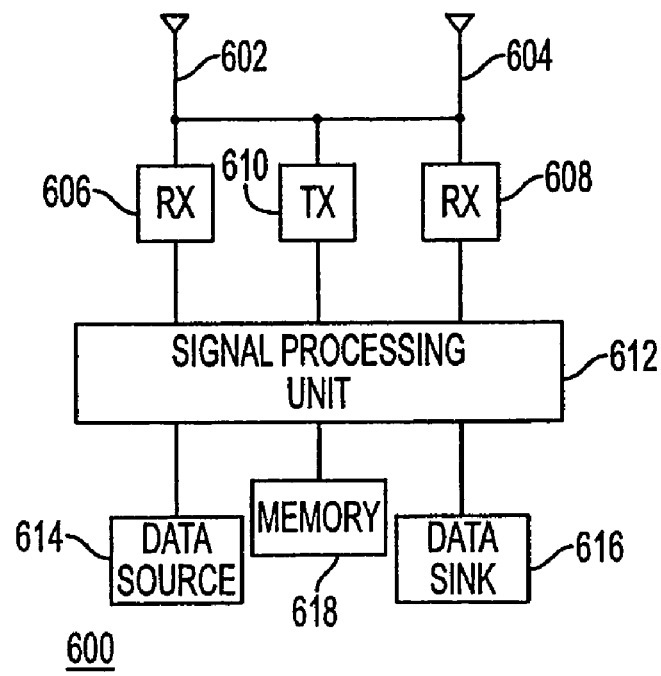
FIG. 6 is a block diagram of a communication device in accordance with another embodiment of the present invention.

FIG. 6 is a block diagram of a communication device 600 capable of operating in communication system 500. Communication device 600 can be any communication device capable of engaging in a wireless OFDM communication, such as but not limited to a cellular telephone or a base station. Preferably, communication device 600 is capable of operating on either of transmit side 560 or receive side 562 of communication system 500, that is, is capable of being a transmitting communication device or a receiving communication device. Communication device 600 includes multiple antennas 602, 604 (two shown) that are each coupled to a respective receiver 606, 608 (two shown) and to a transmitter 610. Each of receivers 606, 608 and transmitter 610 are further coupled to a signal processing unit 612, which signal processing unit 612 is further coupled to each of a data source 614 and a data sink 616. Transmitter 610 preferably includes an upconverter 516 and a power amplifier 518 and performs functions of a transmitter 556. Receivers 606 and 608 preferably each includes one of multiple low noise amplifiers 520, 521 and one of multiple downconverters 522, 523, and together preferably perform functions of a receiver 558. Signal processing unit 612 preferably performs functions of each of blocks 504-514, 524-534, 550-555, and 558 as described below with respect to FIG. 5, which functions are performed by either a transmitting communication device or a receiving communication device, whichever is appropriate. Similar to signal processing unit 308, the various functions of signal processing unit 612 as described herein may be implemented in hardware, software, or a combination of hardware and software.

The operation of transmit side 560 of communication system 500 is similar to the operation of transmit side 260 of communication system 200. An encoder 504 receives user information, preferably in a binary form, from a data source 502, such as data source 614. Encoder 504 applies an error correcting code to the user information and outputs a bit stream. The bit stream is routed to a symbol mapper 506 that is coupled to encoder 504. Symbol mapper 506 groups the bit stream into multiple groups of bits and maps each group of bits to a corresponding symbol to produce a symbol stream. Symbol mapper 506 then routes the symbol stream to a S/P converter 508 coupled to the symbol mapper. S/P converter 508 converts the symbol stream from a serial form to a parallel form, producing N parallel symbols where N is the number of subcarriers contained in a frequency bandwidth allocated to a communication session. Alternatively, when fewer than the N subcarriers are modulated by orthogonal modulator 210, S/P converter 208 produces a quantity of parallel symbols corresponding to a quantity of subcarriers modulated by the orthogonal modulator. S/P converter 508 then applies the N parallel symbols to an orthogonal modulator 510 coupled to the S/P converter. Orthogonal modulator 510 modulates each subcarrier of N orthogonal subcarriers by a symbol of the N parallel symbols and conveys the modulated subcarriers to a subcarrier suppression block 550.

Similar to subcarrier suppression block 250 of transmit side 260, subcarrier suppression block 550 of transmit side 560 receives subcarrier suppression information from receive side 562 via receiver 558. The subcarrier suppression information includes information similar to the subcarrier suppression information described above with respect to communication system 200, and is determined by a subcarrier measurement block 552 in receive side 562 similar to the determination of subcarrier suppression information by subcarrier measurement block 252 in receive side 262. Subcarrier measurement block 252 then transmits the subcarrier suppression information to transmit side 560 via transmitter 556 and either one or both of antennas 564 and 565.

When indicated by the received subcarrier suppression information, subcarrier suppression block 550 suppresses one or more of the modulated subcarriers to produce one or more suppressed subcarriers and one or more non-suppressed subcarriers. In another embodiment of the present invention, subcarrier suppression block 550 may be included in orthogonal modulator 510. When included in orthogonal modulator 510, subcarrier suppression block 550 suppresses one or more of the multiple orthogonal subcarriers prior to modulation by orthogonal modulator 510, and orthogonal modulator 510 modulates only the non-suppressed subcarriers.

Subcarrier suppression block 550, or alternatively orthogonal modulator 510 when subcarrier suppression block 550 is included in the orthogonal modulator, then conveys the suppressed and the non-suppressed subcarriers, or alternatively only the non-suppressed subcarriers, to a P/S converter 512. P/S converter 512 converts the subcarriers received from subcarrier suppression block 550, or alternatively from orthogonal modulator 510, from a parallel form to a serial form to produce an output signal 513. P/S converter 512 conveys output signal 513 to a C/P adder 514 that appends a guard band interval, or cyclic prefix, to signal 513 to produce output signal 515. C/P adder 514 conveys output signal 515 to an upconverter 516 that upconverts output signal 515 from a baseband frequency to a transmit frequency. The upconverted signal is conveyed to power amplifier (PA) 518 that amplifies the signal and transmits the amplified signal via one or more antennas (one shown) and a communication channel 540.

On receive side 562 of communication system 500, each of multiple antennas 564, 565 receives the transmitted signal. Different positions of each of the multiple antennas 564, 565 with respect to the receive side 562 may result in received signals of different signal amplitudes and phases. Each antenna 564, 565 routes the received signal to one of multiple low noise amplifiers (LNA) 520, 521 that is coupled to the antenna. Each LNA 520, 521 amplifies the signal received from an antenna 564, 565 and routes the amplified signal to one of multiple downconverters 522, 523 that is coupled to the LNA. Each downconverter 522, 523 downconverts the signal received from a LNA 520, 521 from the transmit frequency to a baseband frequency. Each downconverter 522, 523 then conveys the downconverted signal to one of multiple equalizers 554, 555 that is coupled to the downconverter.

Figure 7:
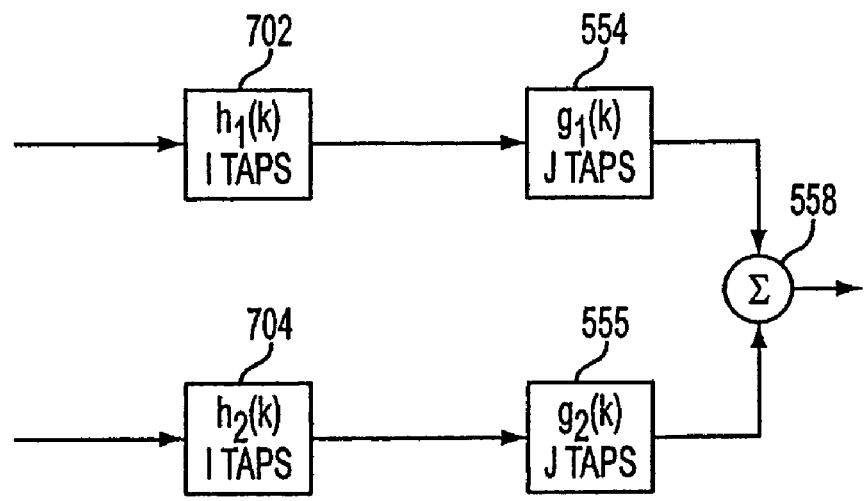
FIG. 7 is a block diagram of a composite communication channel in accordance with another embodiment of the present invention.

Equalizers 554 and 555 provide compensation for an excessive multipath delay, that is, for delay in excess of a tolerable multipath delay such as a length of the cyclic prefix, that may be introduced into the received signal by an unpredictable communication channel 540. FIG. 7 is a block diagram of a composite communication channel 700 that includes the multiple equalizers 554, 555 (two shown) and multiple communication channels 702, 704, wherein each equalizer 554, 555 is preceded by one of the multiple communication channels 702, 704. In FIG. 7, $g_1(k)$ and $h_1(k)$ are unit pulse responses respectively corresponding to equalizer 554 and communication channel 702, and $g_2(k)$ and $h_2(k)$ are unit pulse responses respectively corresponding to equalizer 555 and communication channel 704. Communication channel 702 includes communication channel 540 and receive side 562 of the receiving communication device prior to equalizer 554 (i.e., receiving antenna 564, LNA 520, and downconverter 522). Communication channel 704 includes communication channel 540 and receive side 562 of the receiving communication device prior to equalizer 555 (i.e., receiving antenna 565, LNA 521, and downconverter 523).

Composite communication channel 700 can be represented as a discrete filter, f(k), wherein $$f(k) = h_1(k) * g_1(k) + h_2(k) * g_2(k) \quad (1)$$

(i.e., $h_1(k)$ convolved with $g_1(k)$ plus $h_2(k)$ convolved with $g_2(k)$). The task of equalizers 554 and 555 (i.e., $g_1(k)$ and $g_2(k)$) is to produce a composite communication channel 700, f(k), wherein the composite communication channel appears to be a communication channel of a tolerable multipath delay to the receiving communication device, regardless of a multipath delay of a propagation environment (i.e., communication channel 540). Preferably, composite communication channel 700 appears to be a communication channel with a multipath delay of, at most, a length of the cyclic prefix (i.e., 'L' taps wherein L is preferably equal to 16), although, in the alternative, the design of composite communication channel 700 may be oriented to any tolerable multipath delay.

Similar to communication system 200, each of communication channels 702 and 704 can be represented as an FIR filter. For example, each of communication channels $h_j(k)$, j=1, 2, can be represented by a corresponding transfer function, or FIR filter, $$H_j(z) = \sum_{i=0}^{I} h_{j,i} z^{-i}, \; j = 1, 2,$$

or by a corresponding vector $H_j=[h_j(0)\ h_j(1)\ \ldots\ h_j(I)]$, j=1, 2, wherein each of $h_j(0), h_j(1), \ldots, h_j(I)$, is a coefficient of the z-transformation representation. Similarly, each of equalizers 554, 555, or $g_j(k)$, j=1, 2, is an equalization function that can be represented by a corresponding transfer function, or FIR filter, $$G_j(z) = \sum_{i=0}^{J} g_{j,i} z^{-i}, \; j = 1, 2,$$

or by a corresponding vector $G_j=[g_j(0)\ g_j(1)\ \ldots\ g_j(J)]$, j=1, 2, wherein each of $g_j(0), g_j(1), \ldots, g_j(J)$, is a coefficient corresponding to a tap in the filter $G_j(z)$ and 'J' corresponds to a number of taps in the equalizer. In the present invention, an equalizer G(z) has a suitable number of taps 'J' such that when I>16, the convolution of g(k) with h(k) produces a composite communication channel with a delay of less than or equal to 16 taps.

As described above, equalizers 554 and 555 function to restrict the multipath path delay of composite communication channel f(k) to 'L' taps (preferably L=16). Rewriting equation (1) in a matrix format, $$f = H_1 g_1 + H_2 g_2 \quad (2)$$

wherein f is a vector representation of composite communication channel 700 (i.e., of the coefficients of a discrete filter corresponding to composite communication channel 700), $H_1$ is a matrix representation of a transfer function corresponding to communication channel 702, $g_1$ is a vector representation of equalizer 554 (i.e., the coefficients of a digital filter corresponding to equalizer 554), $H_2$ is a matrix representation of a transfer function corresponding to communication channel 704, and $g_2$ is a vector representation of equalizer 555 (i.e., the coefficients of a digital filter corresponding to equalizer 554). That is, $$f = [\,f(0)\ \ f(1)\ \ \ldots\ \ f(L)\ \ f(L+1)\ \ \ldots\ \ f(I+J-2)\,]^T$$
$$= [\,f_L^T\ \ f_R^T\,]^T, \text{ and}$$

-continued $$H_j = \begin{bmatrix} h_j(0) & 0 & \cdots & \cdots & 0 \\ h_j(1) & h_j(0) & \ddots & & \vdots \\ h_j(2) & h_j(1) & h_j(0) & \ddots & \vdots \\ \vdots & h_j(2) & h_j(1) & \ddots & 0 \\ h_j(I-1) & \ddots & h_i(2) & \ddots & h_j(0) \\ 0 & h_j(I-1) & \ddots & \ddots & h_j(1) \\ \vdots & \ddots & h_j(I-1) & \ddots & h_j(2) \\ \vdots & \ddots & \ddots & \ddots & \vdots \\ 0 & \cdots & \cdots & 0 & h_j(I-1) \end{bmatrix}$$

$$= \begin{bmatrix} H_{j,L} \\ H_{j,R} \end{bmatrix}, \text{ and}$$

$$g_j = [\, g_j(0) \quad g_j(1) \quad \cdots \quad g_j(J-1) \,]^T,$$

wherein the representations $[\,]^T$ or $x^T$ correspond to the transpose of the vector or matrix represented by x or by the elements between the brackets, $j=1, 2$, $f_L$ and $f_R$ are vectors that respectively include the first L taps of f and remaining taps of f, $H_{j,L}$ and $H_{j,R}$ are matrices that respectively include the first L rows of $H_j$ and the remaining rows of $H_j$, and J is a length of each of equalizers 554 and 555. Forcing the constraint of only having L non-zero taps in f implies setting each element of $f_R$ to zero, and in turn implies that $$H_R g = 0 \tag{3}$$

wherein $$H_R = [\, H_{1,R} \quad H_{2,R} \,], \text{ and} \tag{4}$$

$$g = \begin{bmatrix} g_1 \\ g_2 \end{bmatrix}.$$

The vector, or filter, g (as each entry in g can be thought of as a tap in a digital filter) is a composite equalization function that includes each of the multiple equalization functions, that is, $g_1$ and $g_2$. By determining the vector g, the present invention also determines each of $g_1$ and $g_2$.

In order to satisfy the constraint that f have only L non-zero taps, matrix $H_R$ must have a null space, that is, $H_R$ must satisfy the constraint I+J−L−1<2J. This condition can be achieved by proper choice of J. Equation (3) includes '$M_d$=I+J−L−1' constrained, or dependent, variables and '$M_f$=J+L.+1−I' free, or independent, variables ('$M_d$' and '$M_f$' are unrelated to the variable 'M' above). The vector g may then be represented as $$g = \begin{bmatrix} g_f \\ g_d \end{bmatrix},$$

wherein $g_f$ and $g_d$ are each a vector and respectively includes the first '$M_f$' (free) entries of g and the remaining '$M_d$' (dependent) entries of g Similarly, matrix $H_R$ in equation (4) may be repartitioned as $H_R=[H_f\, H_d]$, wherein $H_f$ is a matrix that includes the first $M_f$ columns of matrix $H_R$ and $H_d$ is a matrix that includes the remaining $M_d$ columns of $H_R$. Equation (3) may then be rewritten as $$H_f g_f + H_d g_d = 0, \text{ or } g_d = -H_d^{-1} H_f g_f \tag{5}$$

Matrix $H_d$ is always square and full rank. Consequently, $$f_L = (H'_{1,L} - H'_{2,L}\, H_d^{-1}\, H_f) g_f = A(h_1, h_2) g_f, \tag{6}$$

wherein $H'_{1,L}$ and $H'_{2,L}$ are matrices that respectively include the first L rows in $H_1$ and the first L rows $H_2$. The digital filter representations, or equalization functions, corresponding to each of equalizers 554 (i.e., $g_1$) and 555 (i.e., $g_2$) can then be written as follows $$g = \begin{bmatrix} I \\ H_d^{-1} H_f \end{bmatrix} g_f = B(h_1, h_2) g_f, \text{ and} \tag{7a}$$

$$g_1 = [\, g(1) \quad g(2) \quad \cdots \quad g(J) \,]^T, \tag{7b}$$
$$g_2 = [\, g(J+1) \quad g(J+2) \quad \cdots \quad g(2J) \,]^T.$$

An infinite number of solutions exist for equalizers 554 and 555 that may satisfy the constraint in (3). Equalizers 554 and 555 can then be constructed based on any g in the format of equations (7a) and (7b), wherein each entry in vectors $g_1$ and $g_2$ corresponds to a tap in a respective equalizer, or equalization function, 554 and 555.

The above described technique for determining equalizers 554 and 555 does not consider an issue of noise enhancement. Noise enhancement results when equalizers that are determined by the above described technique and then integrated into communication system 500, creating a composite communication channel 700, create signal nulls at one or more subcarriers. The nulls do not exist in the equalizers themselves and are not addressed by equations (7a) and 7(b). Each null causes a degradation of the signal component at the subcarrier corresponding to the null but not an equivalent degradation of the noise component. As a result, each null enhances the noise significantly at the subcarrier, thereby degrading a performance of communication system 500. Therefore, the present invention provides for equalizer optimization by signal processing unit 308 of receiving side 562 or the receiving communication device in order to reduce a likelihood that a selected filter g will create undesirable signal nulls. However, equalizer optimization is not necessary to the present invention and in an alternative embodiment of the present invention, equalizer optimization is not included.

Signal processing unit 308 optimizes the performance (as measured by a packet error rate for a given SNR) of equalizers 554 and 555 by selecting an optimal composite equalization function g from among the infinite number of solutions to equations (7a) and (7b), subject to the constraint that f have only L non-zero taps. In selecting an optimal composite equalization function g, only a limited range of possible composite equalization functions need be considered, rather than all possible composite equalization functions that satisfy the constraints for composite equalization function g.

The noise enhancement problem is inversely related to SNR. As a result, the noise enhancement problem can be addressed by maximizing a minimum subcarrier SNR resulting from employment of a composite equalization function g. FIG. 8 is a table 800 illustrating an embodiment of selecting an optimal subcarrier by maximizing a minimum subcarrier SNR resulting from employment of a composite equalization function g. Table 800 is provided merely for the purpose of illustrating the principles of the present invention and is not intended to limit the invention in any way.

Each column of table 800 corresponds to a composite equalization function, $g_{fi}$, i =1, ..., $N_{gf}$ in a limited range of $N_f$ composite equalization functions $g_f$. Each row of table 800 corresponds to a subcarrier of multiple subcarriers used to transmit information in communication system 500. For each composite equalization function of the $N_f$ composite equalization functions, a signal processing unit 308 of the receiving communication device, preferably the subcarrier measurement block 552 of the receiving communication device, determines an SNR for each subcarrier of the 'n' subcarriers included in a signal received by the receiving communication device. That is, for a first composite equalization function $g_{f1}$, signal processing unit 308 determines a first SNR for a first subcarrier of the 'n' subcarriers (i.e., $SNR_1(g_{f1})$), a second SNR for a second subcarrier of the 'n' subcarriers (i.e., $SNR_2(g_{f1})$), a third SNR for a third subcarrier of the 'n' subcarriers (i.e., $SNR_3(g_{f1})$), and so on. Similarly, for a second composite equalization function $g_{f2}$, signal processing unit 308 determines an SNR for a first subcarrier (i.e., $SNR_1(g_{f2})$), an SNR for a second subcarrier (i.e., $SNR_2(g_{f2})$), an SNR for a third subcarrier (i.e., $SNR_3(g_{f2})$), and so on. A similar determination of SNR's is made for each composite equalization function, $g_{fi}$, $i=1, \ldots, N_{gf}$.

Signal processing unit 308 then determines, for each composite equalization function $g_{fi}$, a minimum SNR from among the determined SNR's. For example, for composite equalization function $g_{f1}$, signal processing unit 308 determines a minimum SNR from among $SNR_j(g_{f1})$, $j=1, \ldots, n$. The minimum SNR, (e.g., $SNR_1(g_{f1})$), for composite equalization function $g_{f1}$ can be designated $SNR_{min}(g_{f1})$. For composite equalization function $g_{f2}$, signal processing unit 308 determines a minimum SNR from among $SNR_j(g_{f2})$, $j=1, \ldots, n$, (e.g., $SNR_3(g_{f2})$), and designates the minimum SNR for composite equalization function $g_{f2}$ as $SNR_{min}(g_{f2})$. For composite equalization function $g_{f3}$, signal processing unit 308 determines a minimum SNR from among $SNR_j(g_{f3})$, $j=1, \ldots, n$, (e.g., $SNR_2(g_{f3})$), and designates the minimum SNR for composite equalization function $g_{f3}$ as $SNR_{min}(g_{f3})$. Signal processing unit 308 then compares to each other the minimum SNR's determined for each of the composite equalization function, $g_{fi}$, $i=1, \ldots, N_{gf}$ and determines a maximum SNR from among the minimum SNR's. That is, signal processing unit 308 compares each $SNR_{min}(g_{fi})$, $i=1, \ldots, N_{gf}$, to each other and determines a maximum SNR from among the $SNR_{min}(g_{fi})$'s. Signal processing unit 308 then selects the composite equalization function that corresponds to the maximum SNR from among the $SNR_{min}(g_{fi})$'s and uses the selected composite equalization function to construct equalizers 554 and 555 pursuant to equations (7a) and (7b).

For example, the SNR of the $n^{th}$ subcarrier can be expressed as $$SNR_n = \frac{|F_n|^2}{|G_{1,n}|^2 + |G_{2,n}|^2} \tag{8}$$

wherein F is the FFT of f and can be expressed as $F=[F_1\ F_2\ \ldots\ F_N]^T=FFT\{f,N\}=\Gamma_J A(h_1, h_2)g_{fi}=\Lambda g_{fi}$. Similarly, $G_1$ and $G_2$ are the FFT's of $g_1$ and $g_2$, respectively, and can be expressed as $$G_1 = FFT\{g_1, N\} = Wg_{fi} \tag{9a}$$

$$G_2 = FFT\{g_2, N\} = Yg_{fi} \tag{9b}$$

The expression in (8) can then be equivalently written as $$SNR_n(g_{fi}) = \frac{g_{fi}^T \lambda_n \lambda_n^T g_{fi}}{g_{fi}^T (\upsilon_n \upsilon_n^T + \mu_n \mu_n^T) g_{fi}} \tag{10}$$

where $\lambda_n$, $\mu_n$ and $\upsilon_n$ are the $n^{th}$ row in each of matrices $\Lambda$, W and Y respectively stacked as a column vector.

Signal processing unit 308 maximizes a minimum SNR resulting from a selection of one of multiple composite equalization functions $g_{fi}$ by determining a maximum value $\alpha$ for each of the multiple filters, subject to the following constraint for each of the multiple composite equalization functions $g_{fi}$, $$SNR_n(g_{fi}) = g_{fi}^T (\lambda_n \lambda_n^T - \alpha \Lambda_n \Lambda_n^T - \alpha \mu_n \mu_n^T)$$
$$g_{fi} = g_{fi}^T W_n g_{fi} > 0, \text{ wherein } n = 0, 1, \ldots, N-1 \tag{11}$$

In general, the matrices $W_n$ are indefinite. The value initially assigned to $\alpha$ is up to the designer of system 500. If for any particular 'n', an associated matrix $W_n$ is negative definite, then there is no solution for the problem in (11) and the value assigned to $\alpha$ should be decreased. If for every subcarrier 'n', an associated matrix $W_n$ is positive definite, then any $g_{fi}$ will work. For the indefinite case, a solution to equation (11) may or may not be available. If an $\alpha$ exists that meets the constraint imposed by equation (11), then $\alpha$ may be increased and $SNR_n(g_{fi})$ redetermined for each subcarrier 'n' until a maximum value for the value $\alpha$ is attained. The composite equalization functions $g_{fi}$ that yields the largest value for $\alpha$ is then used by signal processing unit 308 to construct equalizers 554 and 555.

In another embodiment of the present invention, maximization of the minimum subcarrier SNR determined with respect to each composite equalization function of multiple composite equalization functions $g_f$ can be represented by the following maximization equation:

$$\max_{g_{fi} \in C^{M_f}} \min_{n=0,1,\ldots,N-1} SNR_n(g_f) = \max_{g_{fi} \in C^{M_f}} \kappa(g_f) \tag{12}$$

wherein C is the set of complex numbers. There is no simple analytical solution for equation (12). However, those of ordinary skill in the art realize that any one of numerous optimization methods can provide an acceptable sub-optimal solution.

For example, a sub-optimal solution can be obtained by solving equation (12) on a subspace ℵ of composite equalization functions, that is, over a limited set of multiple composite equalization functions $g_{fi}$, instead of solving equation (12) over all possible g's. Subspace ℵ is predetermined and is known to the receiving communication device. Simulations show that the choice of subspace ℵ is not crucial to the performance of system 500, and that if a large enough quantity of arbitrarily or randomly selected composite equalization functions g is used then an acceptable composite equalization function can be found. Signal processing unit 308 selects a quantity 'S' of fixed composite equalization functions $g_{fi}$ wherein 'S' is the cardinality (i.e., the number of elements) of the subspace ℵ. For each composite equalization function, $g_{fi}$, in the set of composite equalization functions $g_f$, signal processing unit 308 determines an SNR of each subcarrier, that is, $SNR_n(g_{fi})$, $n=0, 1, \ldots, N-1$. In addition, for each composite equalization function, $g_{fi}$, signal processing unit 308 determines $n_{min}(g_{fi})$, that is, a subcarrier for which $SNR_n(g_{fi})$ is minimum. The $SNR_n$ for the $n_{min}(g_{fi})$ subcarrier is denoted by $SNR_{n,min}(g_{fi})$. A sub-optimal determination of g, that is, $g_{opt}$, is then the composite equalization function $g_{fi}$ for which $SNR_{n,min}(g_{fi})$ is maximum. The determined $g_{opt}$ is then used as the filter g by signal processing unit 308 to construct each of equalizers 554 and 555.

By way of another exmaple, instead of solving equation (12) by determining an SNR for each subcarrier 'n', and in order to reduce the complexity of the process of determining an optimal composite equalization function g, only the numerator of $SNR_n$ as described by equation (8), that is, $|F_n|^2$, may be determined for each subcarrier with respect to each composite equalization function $g_{fi}$. For each composite equalization function $g_{fi}$, $n_{min}(g_{fi})$ is then the subcarrier for which $|F_n|^2$ is minimum. The $|F_n|^2$ for the $n_{min}(g_{fi})$ subcarrier is denoted by $|F_n|^2{}_{min}(g_{fi})$. A sub-optimal determination of g, that is, $g_{opt}$, is then the composite equalization function $g_{fi}$ for which $|F_n|^2{}_{min}(g_{fi})$ is maximum. The determined $g_{opt}$ is then used by signal processing unit 308 to construct each of equalizers 554 and 555.

The signals produced by equalizers 554 and 555 are each conveyed to a summer 558. Summer 558 combines the signals and conveys the combined signal to a cyclic prefix (C/P) remover 524. C/P remover 524 removes the cyclic prefix that had been appended to the signal by C/P adder 514. C/P remover 524 conveys the cyclic prefix-less signal to S/P converter 526. S/P converter 526 converts the cyclic prefix-less signal from a serial form to a parallel form, outputting multiple parallel modulated subcarriers. The multiple parallel modulated subcarriers are routed by S/P converter 526 to an orthogonal demodulator 528, such as a discrete Fourier Transform (DFT) or a fast Fourier Transform (FFT), that demodulates the transmitted information based upon the multiple orthogonal functions used in orthogonal modulator 510. The output of orthogonal demodulator 528 includes multiple parallel symbols based on the multiple modulated subcarriers, wherein each symbol of the multiple parallel symbols is drawn from the M possible symbols of the constellation used on transmit side 560.

Orthogonal demodulator 528 conveys the multiple parallel symbols to a P/S converter 532. P/S converter 532 converts the symbols from a parallel form to a serial form to produce a symbol stream and conveys the symbol stream to an inverse symbol mapper 532. Inverse symbol mapper 232 takes as input a given symbol from the signal constellation and translates it into a group of $\log_2$ (M) binary values, orbits, suitable for input to a decoder 534. The bits produced by inverse symbol mapper 532 are then conveyed to decoder 534. Decoder 534 decodes the bit stream based on the error correction code to provide received data to a suitable data sink 536, such as data sink 616, which received data is optimally free of errors.

In still another embodiment of the present invention, subcarrier measurement block 552 may determines subcarrier suppression information based on the determination of $g_f$. Upon determination of $g_f$, equalizers 554 and 555 are built and an $SNR_n(g_f)$, or alternatively a $|F_n|^2$, is determined for each subcarrier 'n', n=0, 1, ..., N−1. In one embodiment, a predetermined number of the worst performing subcarriers, that is, the subcarriers with the lowest determined $SNR_n(g_f)$ or $|F_n|^2$, are then selected for suppression. In another embodiment, the $SNR_n(g_f)$ or $|F_n|^2$ determined for each subcarrier is compared to a respective $SNR_n(g_f)$ threshold or $|F_n|^2$ threshold. The subcarriers that compare unfavorably with the threshold (that is, are less than the threshold) are selected for suppression. Subcarrier suppression information that includes the selected subcarriers is then conveyed by subcarrier measurement block 552 to subcarrier suppression block 550 as described above.

In general, by using multiple antennas and multiple equalizers, the present invention further provides for improved intersymbol interference (ISI) reduction over the ISI reduction available from use of a single antenna and a single equalizer. In the multiple antenna embodiment, each antenna of multiple antennas 565, 565 is associated with one of multiple equalizers 554, 555. Each equalizer 554, 555 is then determined by determining a vector, or filter, g, wherein $$g = \begin{bmatrix} g_1 \\ g_2 \end{bmatrix}.$$

The entries in each of vectors $g_1$ and $g_2$ respectively correspond to taps in each of equalizers 554 and 555, and each equalizer may then be realized by implementing the indicated taps. The determination of vector g is such that, when combined with a communication channel 540 through which an OFDM signal is transmitted, a composite communication channel 700 is created that has a multipath delay of, at most, a tolerable delay level. Preferably, the tolerable delay for which the composite communication channel 700 is designed is the length of the cyclic prefix appended to the transmitted OFDM signal.

There is a possibility of noise enhancement in the multiple antenna embodiment resulting from subcarrier nulls created by composite communication channel 700. Therefore, the present invention further provides an optimization process that selects an optimal filter g that is the least likely filter, from among a limited range of possible filters g, to create such nulls. The optimization process provides for a determination of subcarrier SNR's resulting from the implementation of each filter in the limited range of possible filters and selecting a filter based on the subcarrier SNR's associated with each filter. Preferably, the selection process includes the selecting of a filter that produces the greatest value for the filter's worst SNR (i.e., the minimum SNR among the SNR's determined for each of the multiple subcarriers), although those who are of ordinary skill in the art realize that there are many other methods that may be used to select an optimal filter based on SNR. For example, an alternative selection process may select the filter that produces the fewest subcarrier SNR values below a predetermined SNR threshold.

Figure 9:
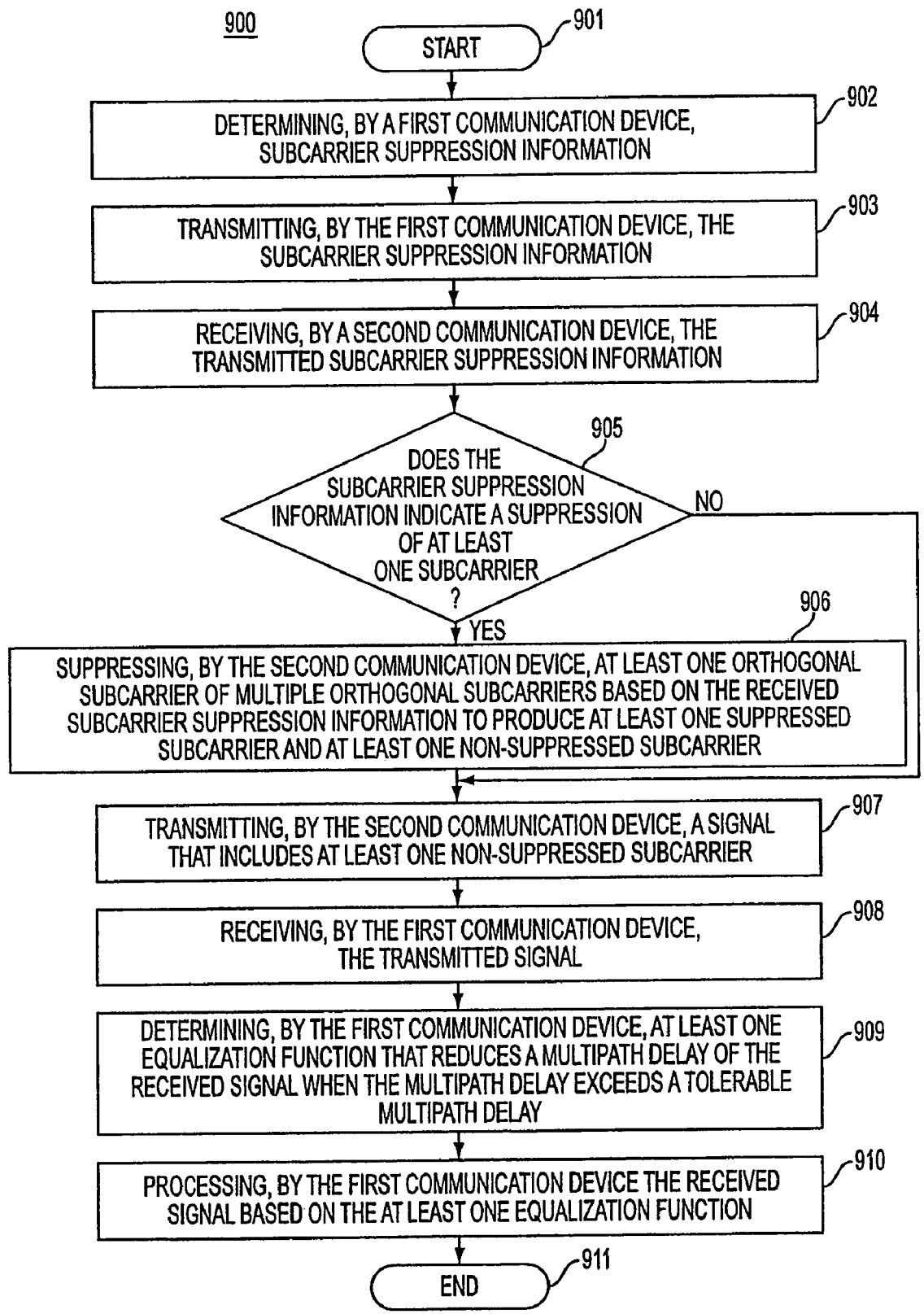
FIG. 9 is a logic flow diagram of the steps performed by a communication system in reducing error in a transmitted signal in accordance with an embodiment of the present invention.

FIG. 9 is a logic flow diagram 900 of the steps performed by a communication system, which system includes multiple communication devices and further includes a transmitted signal having multiple orthogonal subcarriers, in reducing error in the transmitted signal in accordance with the present invention. Preferably the communication system is a wireless communication system wherein multipath delay is introduced to the transmitted signal when the signal is transmitted from a transmitting communication device of the multiple communication devices to a receiving communication device of the multiple communication devices. The logic flow begins (901) when a first communication device of the multiple communication devices determines (902) subcarrier suppression information and transmits (903) the subcarrier suppression information to a second communication device of the multiple communication devices.

In one embodiment of the present invention, the step of determining (902) subcarrier suppression information includes determining a signal quality metric for each subcarrier of the multiple orthogonal subcarriers to produce multiple signal quality metrics. The first communication device then transmits (903) subcarrier suppression information based on the multiple signal quality metrics to the second communication device. In an alternative embodiment of the present invention, in addition to producing multiple signal quality metrics, the step of determining (902) subcarrier suppression information further includes comparing at least one determined signal quality metric to a signal quality metric threshold to produce a comparison. The first communication device then transmits (903) subcarrier suppression information based on the comparison. In another alternative embodiment of the present invention, in addition to producing multiple signal quality metrics, the step of determining (902) subcarrier suppression information further includes determining an order of the multiple orthogonal subcarriers based on the multiple signal quality metrics. The first communication device then transmits (903) and then transmits subcarrier suppression information based on the determined order. In still another embodiment of the present invention, the step of determining (902) subcarrier suppression information includes a step of determining, by the first communication device, a quantity of orthogonal subcarriers for suppression in order to reduce a transmitted power level below a predetermined power level threshold. The first communication device then transmits (903) subcarrier suppression information based on the determined quantity of orthogonal subcarriers.

The second communication device receives (904) the transmitted subcarrier suppression information. When the transmitted subcarrier suppression information does not indicate (905) the suppression of a subcarrier, the second communication device transmits (907) a signal that includes the multiple non-suppressed orthogonal subcarriers. When the transmitted subcarrier suppression information indicates (905) that at least one orthogonal subcarrier of the multiple orthogonal subcarriers should be suppressed, the second communication device suppresses (906) at least one orthogonal subcarrier to produce at least one suppressed subcarrier and at least one non-suppressed subcarrier. The second communication device then transmits (907) a signal that includes at least the non-suppressed subcarrier. Preferably, when at least one subcarrier has been suppressed, the at least one suppressed subcarrier is also transmitted by the second communication device, although alternatively the at least one suppressed subcarrier may not be transmitted. The first communication device receives (908) the signal transmitted by the second communication device to produce a received signal. The first communication device determines (909) at least one equalization function intended to reduce a multipath delay of the received signal when the multipath delay of the received signal exceeds a tolerable level, preferably when the delay exceeds a length of a cyclic prefix appended to the received signal by the first communication device. The first communication device then processes (910) the received signal based on the at least one determined equalization function, thereby reducing the multipath delay of the received signal and reducing the potential for intersymbol interference in the received signal, and the logic flow ends (911).

The step of determining (909) at least one equalization function preferably includes steps of determining a communication channel transfer function and determining a desired composite communication channel transfer function. The step of determining (909) preferably further includes a step of determining at least one equalization function based on the communication channel transfer function and the desired composite communication channel transfer function, such that a convolution of the equalization function with the communication channel transfer function produces the desired composite communication channel transfer function. The desired composite communication channel transfer function includes a tolerable multipath delay, preferably a delay approximately equal to a length of a cyclic prefix appended to a transmitted OFDM signal. The at least one equalization function reduces a multipath delay of the received signal when the multipath delay exceeds the tolerable multipath delay.

In alternative embodiments of the present invention, the invention may include the first communication device performing steps (902) and (903), wherein the subcarrier suppression information is based on the signal quality metric determinations, the second communication device performing steps (904)-(907), the first communication device performing step (909), the first communication device performing steps (908)-(910), or any combination thereof.

Figure 10:
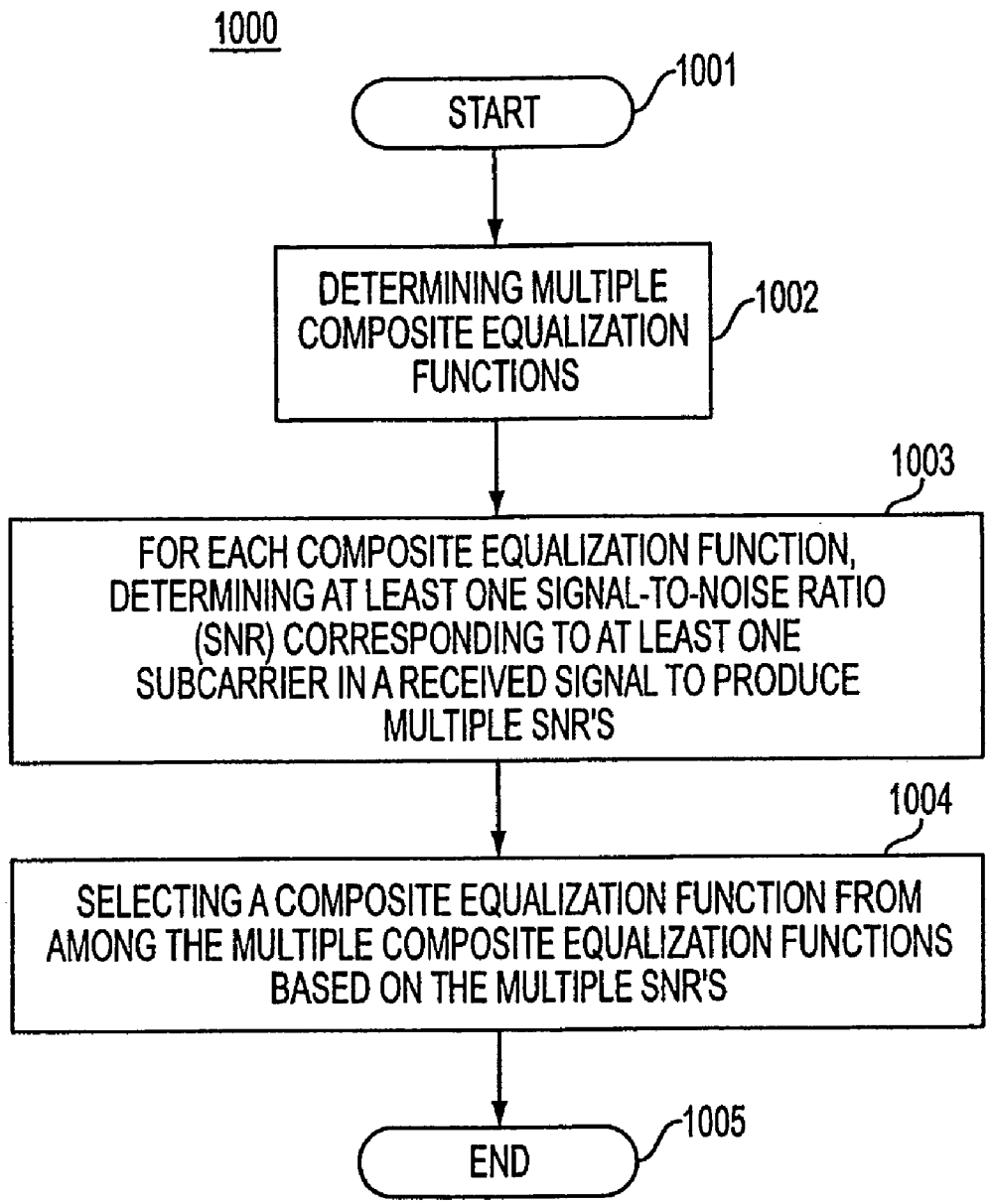
FIG. 10 is a logic flow diagram of the steps performed by a communication device to determine multiple equalization functions in accordance with another embodiment of the present invention.

In another embodiment of the present invention, wherein a receiving communication device includes multiple antennas, the step of determining (909) at least one equalization function includes a step of determining multiple equalization functions, wherein each equalization function of the multiple equalization functions is associated with an antenna of the multiple antennas. FIG. 10 is a logic flow diagram 1000 of steps included in the step (909) of determining multiple equalization functions when the multiple equalization functions are included in a composite equalization function. The logic flow begins (1001) when a receiving communication device determines (1002) multiple composite equalization functions (e.g., $g_{fi}$, i=1, ..., $N_{gf}$), wherein each composite equalization function of the multiple composite equalization functions includes multiple equalization functions (e.g., $g_1$ and $g_2$). The multiple equalization functions included in each composite equalization function are intended to reduce a multipath delay of the received signal when the multipath delay of the received signal exceeds a tolerable level. The receiving communication device then produces multiple SNR's by determining (1003), for each composite equalization function, at least one SNR corresponding to at least one subcarrier included in a signal received by the receiving communication device. Based on the determined SNR's, the receiving communication device then selects (1004) a composite equalization function from among the multiple composite equalization functions, and the logic flow ends (1005). The step, in FIG. 9, of processing (910) the received signal based on the at least one equalization function equalization functions then includes the step of processing a received signal based on the equalization functions included in the selected composite equalization function.

Preferably, the step of selecting (1004) a composite equalization function includes the following steps. A minimum SNR (e.g., $SNR_{n,min}(g_{fi})$) corresponding to each of the multiple composite equalization functions is determined to produce multiple minimum SNR's. Each minimum SNR of the multiple minimum SNR's is compared to the other minimum SNR's to produce multiple comparisons. Based on the multiple comparisons, a greatest minimum SNR is determined. A composite equalization function (e.g., $g_{opt}$) that corresponds to the determined greatest minimum SNR is then selected for processing (910) the received signal.

In still another embodiment of the present invention, wherein the step of determining (1003) at least one SNR includes a step of determining multiple SNR's for each composite equalization function of the multiple composite equalization functions, and wherein each of the multiple SNR's corresponds to a different subcarrier of multiple subcarriers included in a signal received by the receiving communication device, the step of selecting (1004) a composite equalization function may include the following steps. Each determined SNR for each of the multiple composite equalization functions is compared to an SNR threshold. A composite equalization function that yields the fewest SNR determinations that compare unfavorably with the threshold is then selected for processing (910) the received signal.

In sum, the present invention provides a method and an apparatus for error reduction in a communication system that utilizes an orthogonal modulation scheme that includes the transmission of user information via multiple orthogonal subcarriers. A first layer of error reduction provides for the suppression of one or more subcarriers that may cause distortion of a transmitted signal. A second layer of error reduction, which may or may not be used in conjunction with the first layer of error detection, provides for the equalization of a received signal in order to reduce multipath delay of a received signal when the multipath delay exceeds a tolerable multipath delay, preferably a length of a cyclic prefix appended to the signal. The first and second layers of error reduction help preserve the orthogonality of the subcarriers, which orthogonality is critical to correctly extracting user information from a received signal.

While the present invention has been particularly shown and described with reference to particular embodiments thereof, it will be understood by those skilled in the art that various changes in form and details may be made therein without departing from the spirit and scope of the present invention.

What is claimed is:

1. A communication device comprising:
    a receiver that receives a signal that comprises a plurality of orthogonal subcarriers;
    a signal processing unit coupled to the receiver that receives the plurality of orthogonal subcarriers from the receiver, determines a signal quality metric for each subcarrier of the plurality of orthogonal subcarriers, determines subcarrier suppression information based on the determined signal quality metrics, and removes a guard band interval, wherein the signal quality metric for each said subcarrier is determined from a peak-to-average power ratio; and
    a transmitter coupled to the signal processing unit that receives the subcarrier suppression information from the signal processing unit and transmits the received subcarrier suppression information.

2. The communication device of claim 1, wherein the subcarrier suppression information comprises the determined signal quality metrics.

3. The communication device of claim 1, further comprising a memory associated with the signal processing unit that stores a signal quality metric threshold, wherein the signal processing unit further retrieves the signal quality metric threshold from the memory and compares at least one determined signal quality metric to the signal quality metric threshold to produce a comparison, and wherein the subcarrier suppression information comprises the comparison.

4. The communication device of claim 1, wherein the signal processing unit determines a quantity of subcarriers to reduce the peak-to-average power ratio.

5. In a communication system comprising an orthogonal modulation scheme wherein user information is modulated onto a plurality of orthogonal subcarriers, a communication device comprising:
    a receiver that receives a signal comprising subcarrier suppression information, wherein the subcarrier suppression information is based on a plurality of signal quality metrics determined for each orthogonal subcarrier of the plurality of orthogonal subcarriers, wherein the plurality of signal quality metrics is determined from a peak-to-average power ratio;
    a signal processing unit coupled to the receiver that receives the subcarrier suppression information, suppresses at least one orthogonal subcarrier of the plurality of orthogonal subcarriers based on the subcarrier suppression information to produce a suppressed orthogonal subcarrier, receives data sourced by a data source, modulates the data onto a non-suppressed orthogonal subcarrier of the plurality of orthogonal subcarriers to produce a modulated non-suppressed orthogonal subcarrier; and
    a transmitter coupled to the signal processing unit that transmits the modulated non-suppressed orthogonal subcarrier and that inserts a guard band interval to ameliorate intersymbol interference.

6. The communication device of claim 5, wherein the signal processing unit modulates the data onto each orthogonal subcarrier of the plurality of orthogonal subcarriers prior to suppressing the at least one orthogonal subcarrier.

7. In a communication system wherein a communication channel introduces multipath delay to a transmitted signal, a communication device comprising:
    a receiver configured to receive a first signal comprising a plurality of orthogonal subcarriers;
    a signal processing unit coupled to the receiver configured to:
        determine a transfer function corresponding to the communication channel;
        determine an equalization function that is based on a determined communication channel transfer function and that reduces the multipath delay when the multipath delay exceeds a predetermined multipath delay;
        process the signal based on the determined equalization function to reduce intersymbol interference; and
        determine subcarrier suppression information based on the plurality of orthogonal subcarriers included in the first signal; and
        convey the determined subcarrier suppression information to a transmitter coupled to the signal processing unit; and
    the transmitter configured to transmit the subcarrier suppression information.

8. The communication device of claim 7, wherein the determination of an equalization function by the signal processing unit comprises determining a desired composite communication channel transfer function and determining an equalization function based on the communication channel transfer function and the desired composite communication channel transfer function.

9. The communication device of claim 7, wherein the communication device further comprises a plurality of antennas, wherein the reception by the receiver of a signal comprises receiving a transmitted signal via each antenna of the plurality of antennas to produce a plurality of received signals, wherein the transmitted signal comprises a plurality of orthogonal subcarriers, wherein a determination of an equalization function by the signal processing unit comprises a determination of a plurality of equalization functions based on a determination of at least one communication channel transfer function, wherein the plurality of equalization functions together reduce a multipath delay of the transmitted signal when the multipath delay exceeds a predetermined multipath delay, and wherein a processing of the signal by the signal processing unit comprises processing each received signal based on a determined equalization function of the plurality of determined equalization functions.

10. The communication device of claim 9, wherein the determination of a plurality of equalization functions comprises determining a plurality of composite equalization functions, wherein each composite equalization function of the plurality of composite equalization functions comprises a plurality of equalization functions that together reduce a multipath delay of the transmitted signal, determining an optimal composite equalization function from among the plurality of composite equalization functions, and determining a plurality of equalization functions based on the determination of an optimal composite equalization function.

11. The communication device of claim 10, wherein the determination of an optimal composite equalization function comprises determining, for each composite equalization function of the plurality of composite equalization functions, a signal-to-noise ratio (SNR) for at least one subcarrier of a signal received by the communication device to produce determined SNR's, determining, for each composite equalization function of the plurality of composite equalization functions, a minimum SNR from among the determined SNR's, determining a maximum SNR from among the minimum SNR's determined for each composite equalization function of the plurality of composite equalization functions to produce a determined maximum SNR, and determining an optimal composite equalization function based on the composite equalization function corresponding to the determined maximum SNR.

\* \* \* \* \*